United States Patent
Arshadi

(10) Patent No.: US 10,973,361 B1
(45) Date of Patent: Apr. 13, 2021

(54) COOKING SYSTEM FOR FOOD STEAMING OR COOKING

(71) Applicant: WonderWorx LLC, Laguna Niguel, CA (US)

(72) Inventor: Mehrnaz H. Arshadi, Laguna Niguel, CA (US)

(73) Assignee: WONDERWORX LLC, Laguna Niguel, CA (US)

( * ) Notice: Subject to any disclaimer, the term of this patent is extended or adjusted under 35 U.S.C. 154(b) by 0 days.

(21) Appl. No.: 17/005,882

(22) Filed: Aug. 28, 2020

Related U.S. Application Data

(60) Provisional application No. 63/045,840, filed on Jun. 30, 2020, provisional application No. 63/019,163, filed on May 1, 2020.

(51) Int. Cl.
  *A47J 27/04* (2006.01)
  *F24C 15/10* (2006.01)

(52) U.S. Cl.
  CPC .............. *A47J 27/04* (2013.01); *F24C 15/107* (2013.01); *A47J 2027/043* (2013.01)

(58) Field of Classification Search
  CPC ...... A47J 27/04; A47J 2027/043; A47J 36/00; A47J 36/20; A47J 19/023; A47J 19/025;
  (Continued)

(56) References Cited

U.S. PATENT DOCUMENTS 5,428,943 A * 7/1995 Balcombe ............. B65B 31/028
  426/111
5,913,966 A * 6/1999 Arnone ................... A47J 36/20
  126/369

(Continued)

FOREIGN PATENT DOCUMENTS

DE 102012104487 A1 11/2012
EP 2852307 B1 9/2015

(Continued)

OTHER PUBLICATIONS

Toolocity, "Toolocity STSC0035 Water Containment Rings for Core Drilling—Boring—Boring Bits—Amazon.com," https://www.amazon.com/Toolocity-STSC0035-Water-Containment-Drilling/dp/B00D3OVEL4/ref=pd_bxgy_img_2/142-4696362-4618421?_encoding=. . . , Jun. 23, 2020, 6 pages.

(Continued)

*Primary Examiner* — Phuong T Nguyen
(74) *Attorney, Agent, or Firm* — RatnerPrestia

(57) ABSTRACT

The examples herein relate to a cooking tool, and a cooking system and techniques that can be utilized with the cooking tool to steam or cook food. The cooking system includes a placement surface, a heat source to channel heat energy, and a cooking tool coupled to the placement surface. For example, the placement surface is a portion of cookware (e.g., pan or plate) and the heat source is a stove or a microwave. The cooking tool comprises an interior volume and a body that includes a lower body portion positioned on the placement surface and an upper body portion. The lower body portion includes a suction cup base that is coupled to the placement surface to form a sealing chamber to seal a liquid or food inside the interior volume. The upper body portion includes at least one conduit.

32 Claims, 30 Drawing Sheets

(58) Field of Classification Search
CPC ........ A47J 19/04; A47J 36/165; A47J 27/004;
A47J 27/56; A47J 19/00; A47J 27/62;
A47J 27/00; A47J 19/02; A47J 37/0611;
A47J 37/06; A47J 36/16
USPC ......... 99/327, 331, 332, 339, 342, 348, 349,
99/375, 378, 379, 390, 410, 411, 413,
99/422, 425, 446, 448, 506, 516, 536,
99/629, 631, 633
See application file for complete search history.

(56) References Cited

U.S. PATENT DOCUMENTS

| | | |
|---|---|---|
| 9,266,254 B2 | 2/2016 | Schneider |
| 10,357,129 B2 | 7/2019 | Bauer |
| 2020/0182485 A1 | 6/2020 | Ball et al. |

FOREIGN PATENT DOCUMENTS

| | | |
|---|---|---|
| KR | 20120007179 A | 1/2012 |
| WO | 2019038006 A1 | 2/2019 |

OTHER PUBLICATIONS

Contractorsdirect, "542173523 Suction Ring Set Wet Drilling," © 2017-2020 Contractors Direct, https://www.contractorsdirect.com/Water-Ring-Set?gclid=EAlaIQobChMI7cTpz6aW6g1VMBitBh0-Q0gnyEAQYBiABEgITjvD_BwE, 5 pages.

Everything Kitchen, "Helen's Asian Kitchen Steaming Ring for Bamboo Steamer," © 2002-2020 Everything Kichens, https://www.everythingkitchens.com/helens-asian-kitchen-97017-steaming-ring.html?utm_source=google&utm_medium=cse&utm_term=97017&gclid=EAlaIQo#, 5 pages.

Restaurant® SUPPLY.com, "Town 36619 Stainless Steel 18" Diameter Steamer Ring," © 2006-2020 RestaurantSupply, https://www.restaurantsupply.com/town-food-equipment-36619, 5 pages.

Kohl's, "Food Network™ Pressure Cooker Accessory Divider Steamer," © 2020 Kohl's, Inc., https://www.kohls.com/product/prd-3297074/food-network-divided-steamer.jsp? skuid=33643046&ci_mcc=ci&utm_campaignFOOD%20PREP&utm_med, 7 pages.

My Toy Truck, "Silicone Basket Steam Insert Pot Divider for Vegetable or Pasta; Portion Control Space Saver, for Small Family or College Dorm; Space Saver, Gift Giving," © 2020 MyToyTruck, https://www.mytoytruck.com/silicone-basket-steam-insert-pot-divider-for-vegetable-or-pasta-portion-control-space-saver-for-small-family-or-college-dorm-space-saver-gift-giving/, 3 pages.

"Instant Pot Cook/Bake Removable Bottom Round Pan, Divider and Lid with 3 Small Stainless Steel Cups with Lids Bundle," LS: 5252084KIT, printed Aug. 28, 2020, https://lifestyle.focuscamera.com/instant-pot-cook-bake-removable-bottom-round-pan-divider-and-lid-with-3-small-stainless-steel-cups-with-lids-bundle.html, 4 pages.

Neoflam 52005, "Neoflam Steam Plus w, Red Cast Aluminum One-Handle Frying Pan with Ceramic Coating, 10.5", 4 Cooking Holes, Glass Lid," Nov. 5, 2018, https://www.amazon.com/Neoflam-52005-Aluminum-One-handle-Coating/dp/B07K77T1GJ, 7 pages.

Bakesplit, "Bakesplit Adjustable Silicone Baking Sheet Divider for Cooking & Roasting—Magnetic and Fits all Pans—as Seen on TV Kitchenware Gadget & Utensil—Nonstick & Dishwasher Safe," Aug. 7, 2017, https://www.amazon.com/Bakesplit-Adjustable-Roasting-Kitchenware-Dishwasher/dp/B074CQ4FKG/ref=asc_df_B074CQ4FKG/?tag=hyprod-20&linkCode=df0&hvadid=216776299397&hvpos=&hvnetw=g&hvrand=179794433, 9 pages.

DB Roth, "13" Silicone Divider Flexy Pan," Model PPR10163, © 2020 Walmart, https://www.walmart.com/ip/13-SILICONE-DIVIDER-FLEXY-PAN/155959116, 14 pages.

Youtube, "The Best Way to Reheat Pizza by Using Steam—Steam Culture," downloaded from https://www.youtube.com/watch?v=uFJ2j3zdx6o, uploaded by wareboilers on Jun. 7, 2019, 24 pages.

Youtube, "Reheat Pizza the Right Way and Not in the Microwave | Today," downloaded from https://www.youtube.com/watch?v=1uR0_H-8V2M, uploaded by Today on Feb 9, 2018, 18 pages.

* cited by examiner

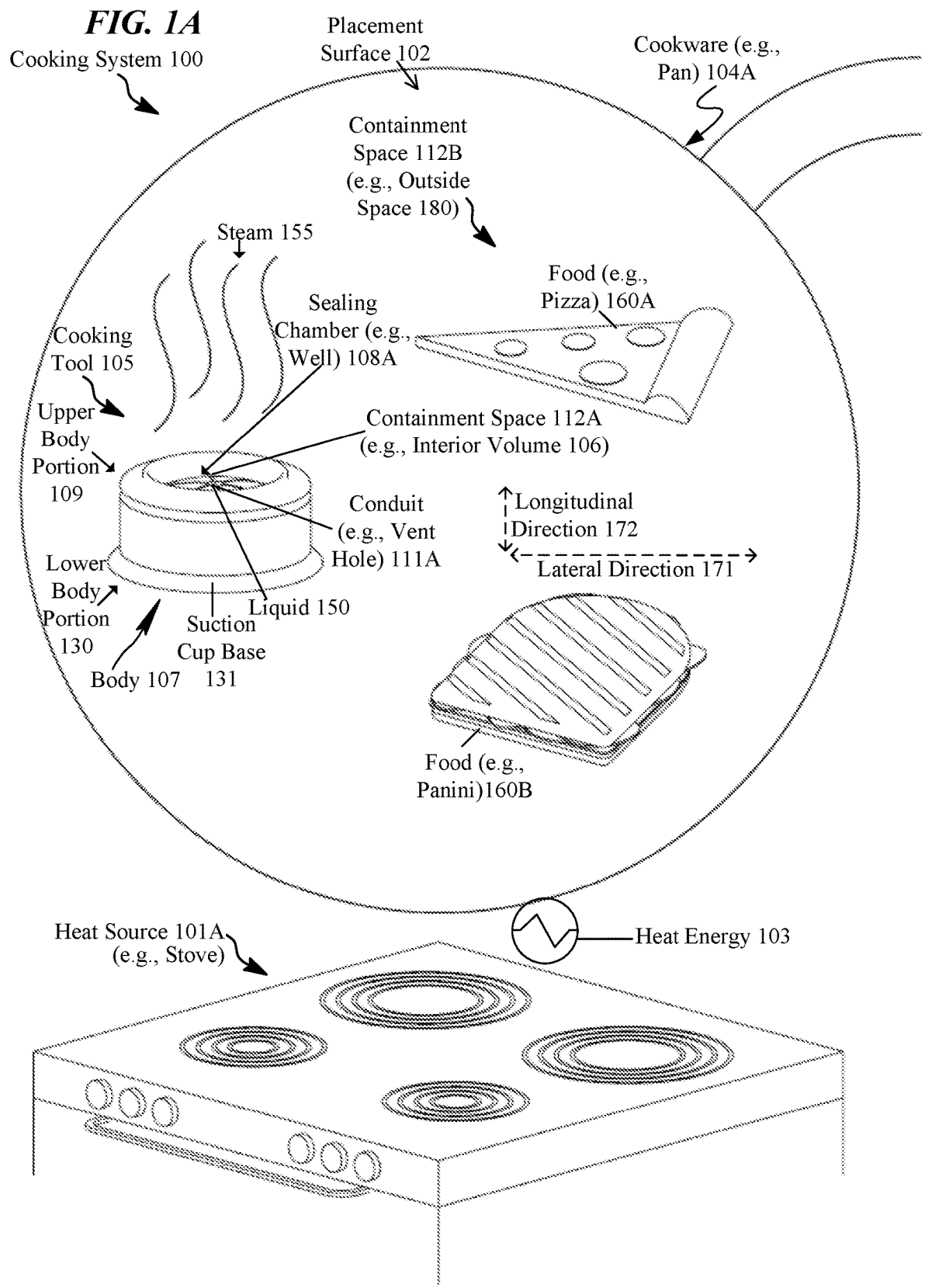

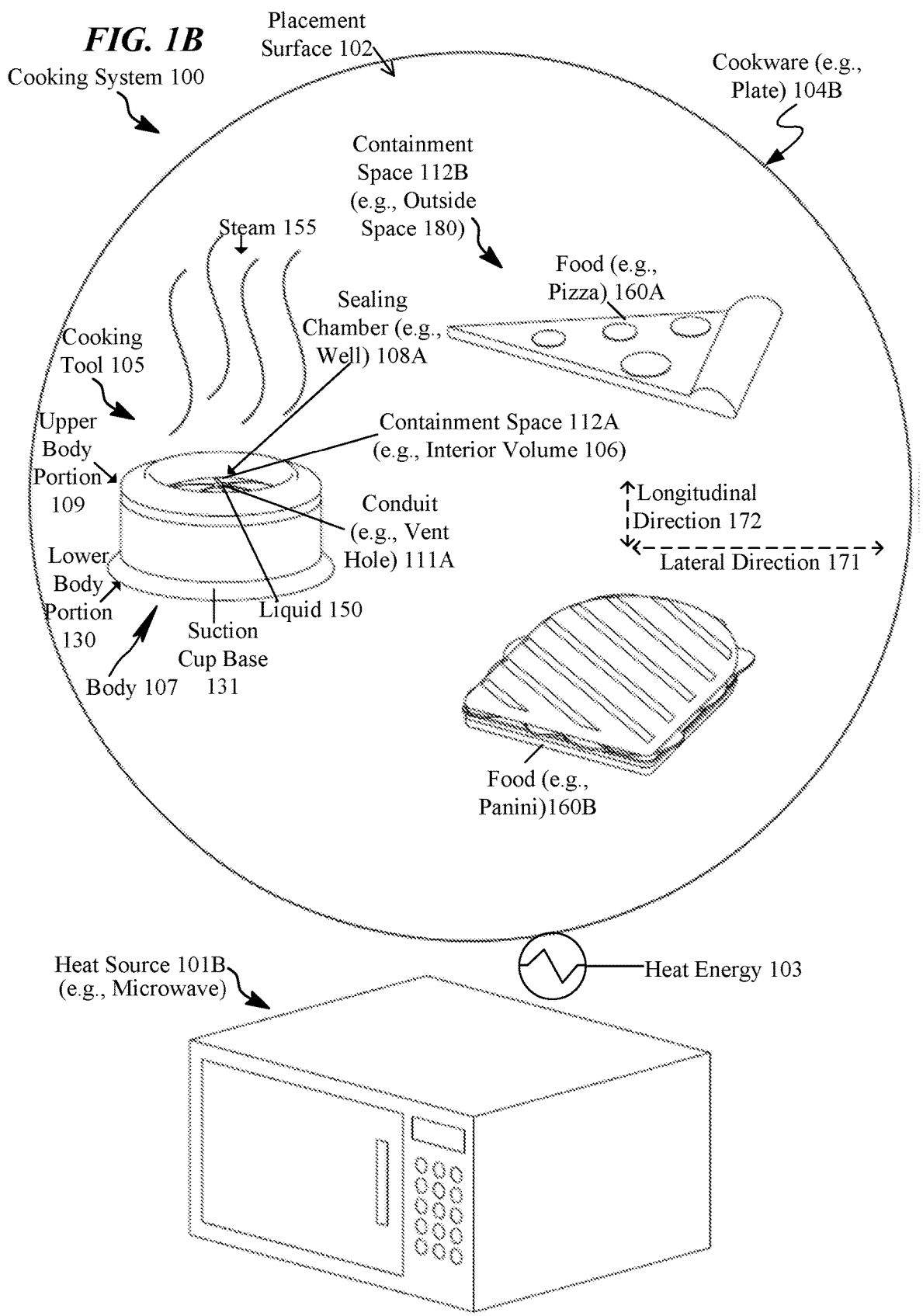

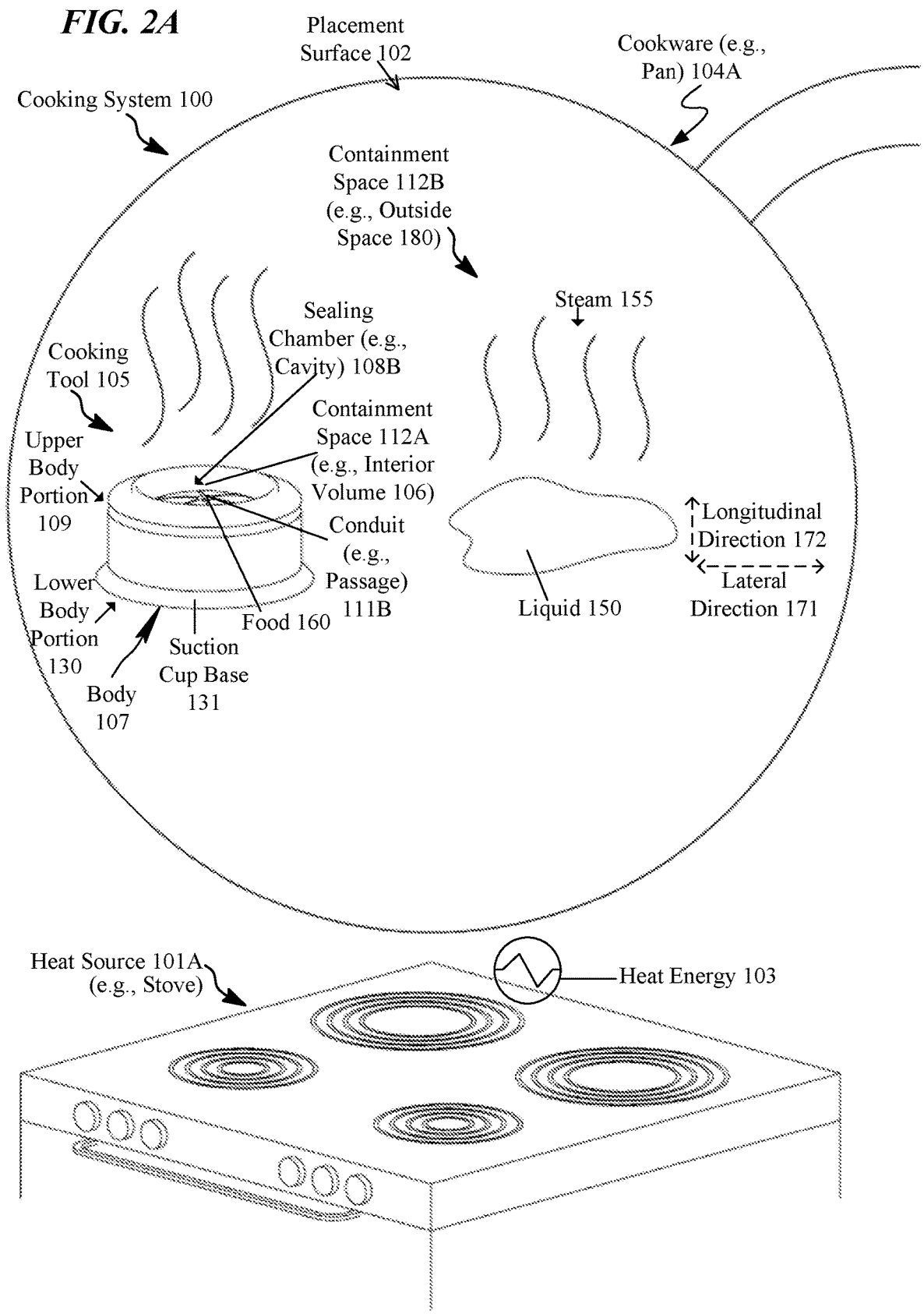

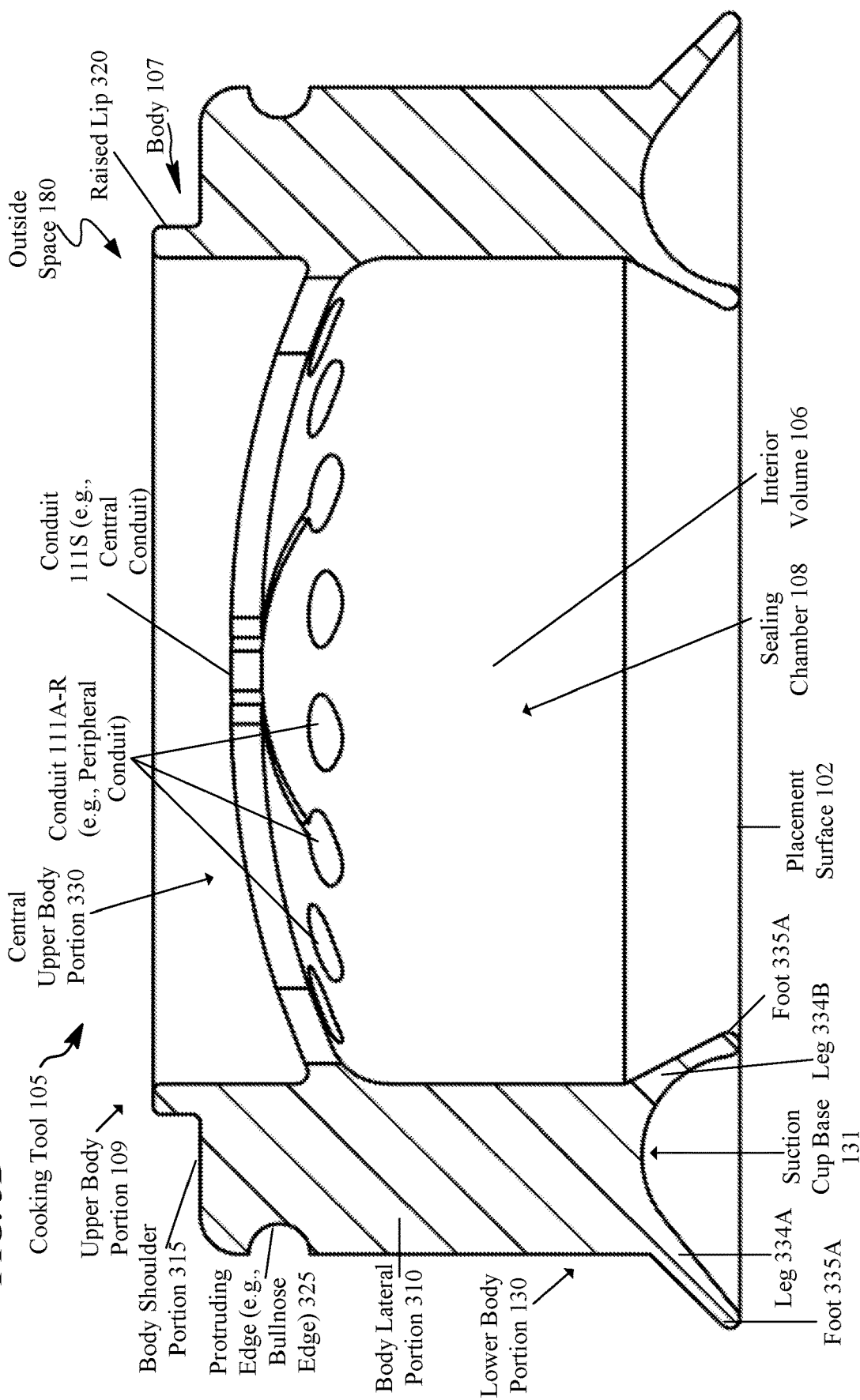

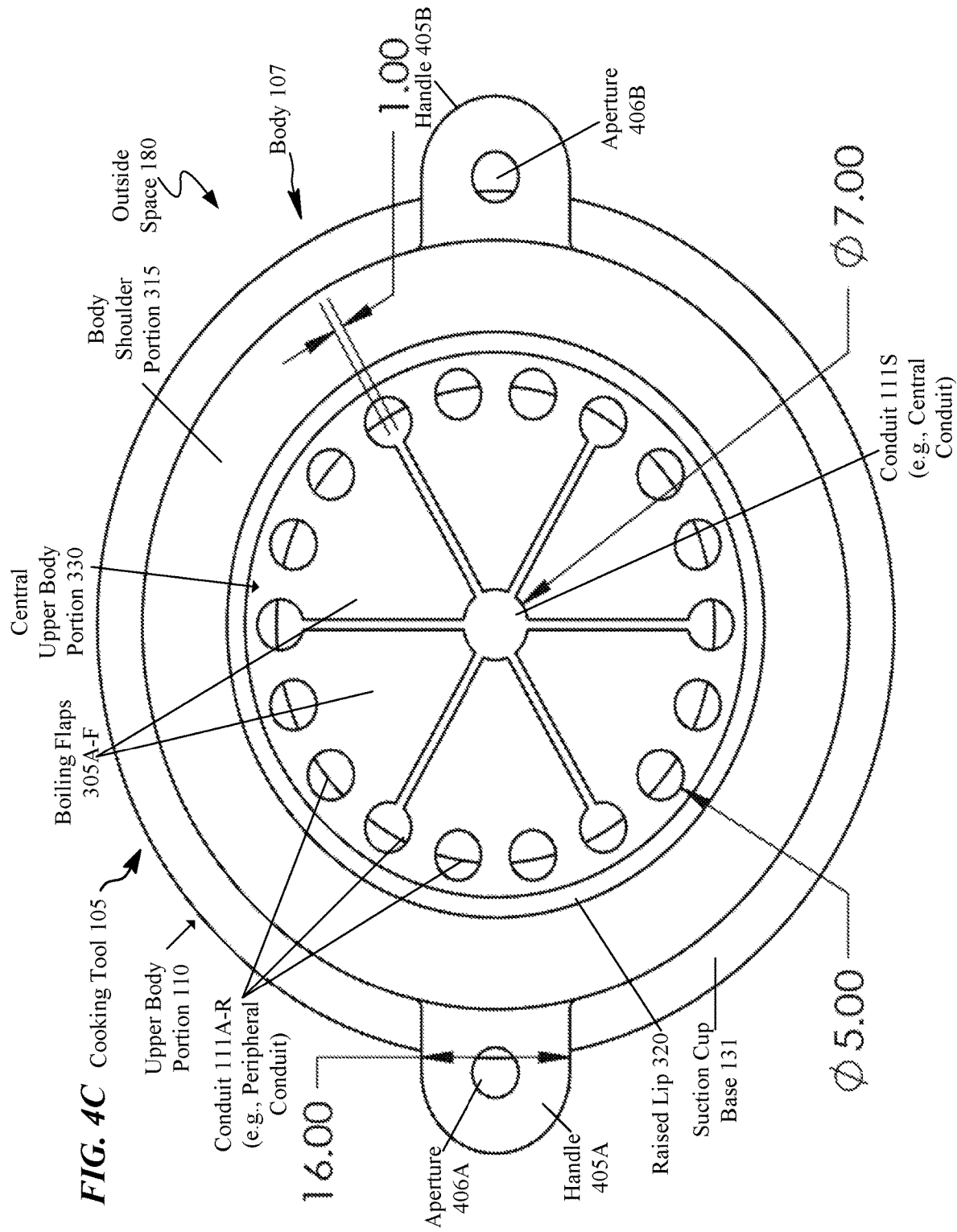
FIG. 4C Cooking Tool 105

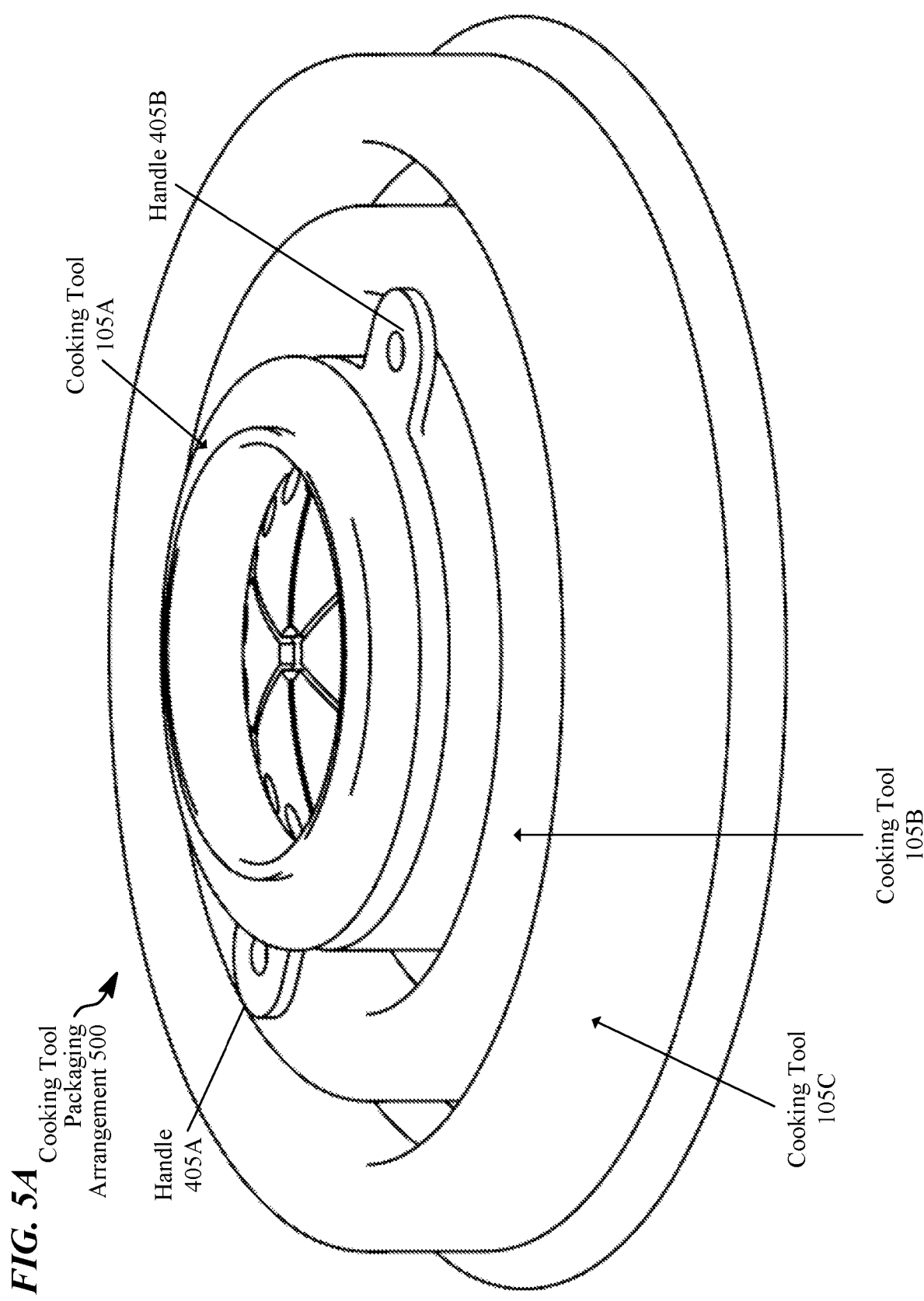

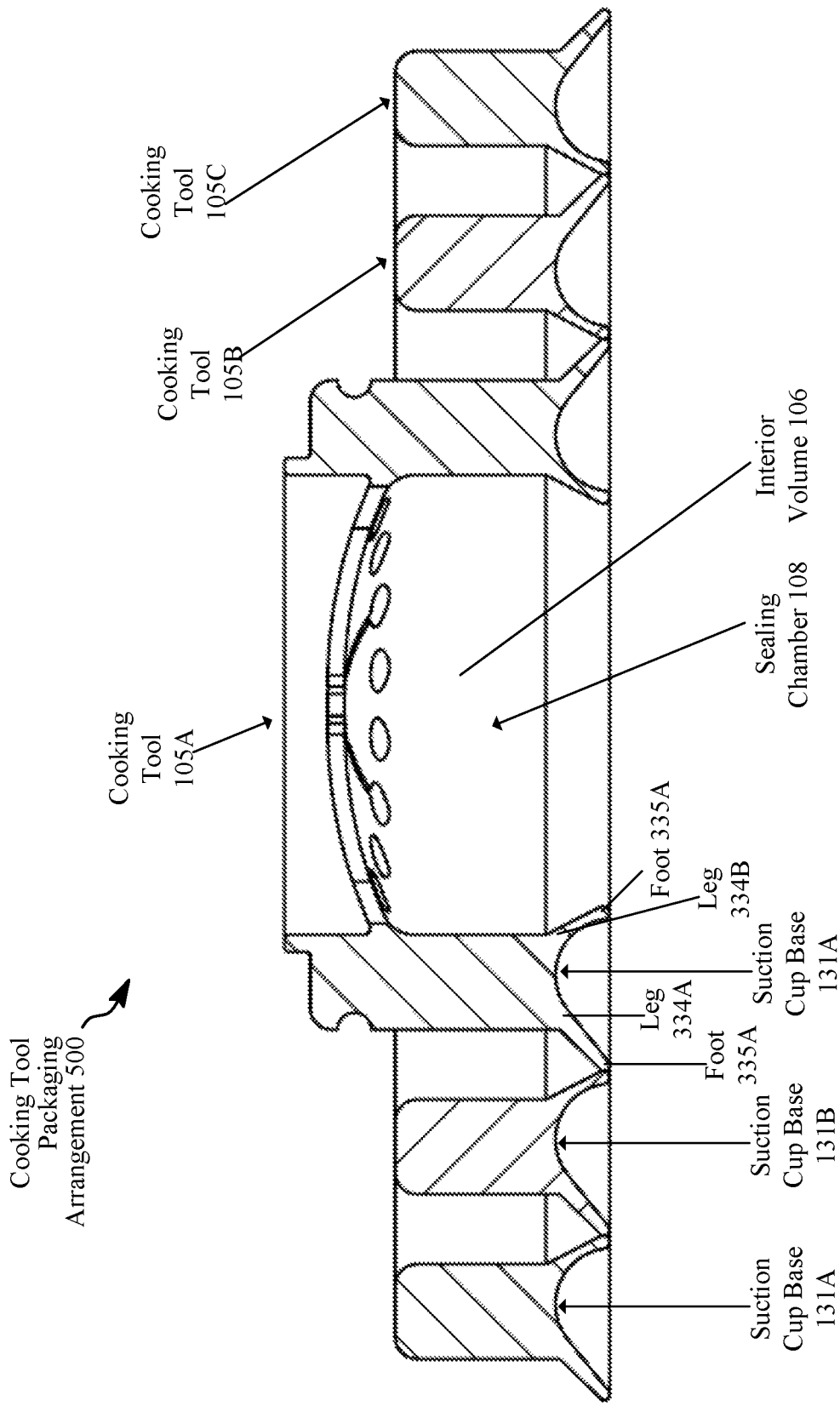

COOKING SYSTEM FOR FOOD STEAMING OR COOKING

CROSS-REFERENCE TO RELATED APPLICATIONS

This application claims priority to U.S. Provisional Patent Application Ser. No. 63/019,163, filed on May 1, 2020, titled "Food Steaming Apparatus"; and U.S. Provisional Patent Application Ser. No. 63/045,840, filed on Jun. 30, 2020, titled "Food Steaming Apparatus," the entire disclosures of which are incorporated by reference herein.

TECHNICAL FIELD

The present subject matter relates to examples of structures of a cooking tool for steaming or cooking food with a heat source. The present subject matter also encompasses a cooking system and techniques that can be utilized with the cooking tool to steam or cook food.

BACKGROUND

Various cooking appliances are available on the market, such as a microwave, stovetop, electrical skillet, conventional oven, convection oven, toaster oven, etc. Unfortunately, each of the foregoing cooking appliances are associated with its own drawbacks. For example, the microwave oven, while offering rapid cooking of foods, can negatively affect the quality, such as texture and taste. Moreover, according to clinical studies, the microwave oven presents numerous health hazards. The toaster oven can dehydrate food as the moisture content of the food evaporates.

For example, freshly baked pizza from the conventional oven typically has a crispy crust and moist toppings. Subsequently, when the pizza is reheated in the conventional oven, the pizza crust no longer maintains a crispy texture. Alternatively, if the pizza is later reheated in the toaster oven, while the crust is further cooked to maintain the crispy texture, the toppings lose moisture and become dried out.

Hence, there is room for improvement in cooking appliances and techniques for reheating food without drying moisture content out of the food.

SUMMARY

A cooking tool includes an interior volume, a body that includes a lower body portion for coupling to a placement surface, and an upper body portion. The lower body portion includes a suction cup base for coupling to the placement surface to form a sealing chamber to seal a liquid or food inside the interior volume. The upper body portion includes at least one conduit. A cooking system can include: the placement surface; a heat source to channel heat energy; and the cooking tool coupled to the placement surface.

In a first example, the food is on the placement surface and located exterior to the interior volume in an outside space that resides outside the cooking tool. The lower body portion is positioned on the placement surface to form the sealing chamber, the sealing chamber being a well filled with liquid in the interior volume. The suction cup base is coupled to the placement surface to enclose the liquid between the placement surface and the upper body portion to form the well filled with the liquid in the interior volume. The upper body portion releases steam generated from the liquid in response to channeled heat energy from the heat source. The at least one conduit includes at least one vent hole to release the generated steam and allow flow of the generated steam out of the interior volume to the outside space to cook the food placed on the placement surface.

In a second example, the liquid is on the placement surface and located exterior to the interior volume in an outside space that resides outside the cooking tool. The lower body portion is positioned on the placement surface to form a sealing chamber, the sealing chamber being a cavity filled with food in the interior volume. The suction cup base is coupled to the placement surface to seal out the liquid on the placement surface and to form the cavity filled with the food in the interior volume. The upper body portion flows steam generated from the liquid in response to channeled heat energy from the heat source. The at least one conduit includes at least one passage to flow the generated steam and allow passage of the generated steam into the interior volume from the outside space to cook the food filling the cavity.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIGS. 1A-B are perspective views of a cooking system depicting components of the cooking system, including a cooking tool that has a well filled with liquid positioned on a placement surface, and a heat source.

FIGS. 2A-B are perspective views of the cooking system like FIGS. 1A-B, in which the cooking tool has a cavity filled with food positioned on the placement surface.

FIG. 3D is a cross-sectional view of the cooking tool of FIGS. 3A-C depicting details of the suction cup base with legs and feet for attachment to the placement surface.

FIG. 4C is the same top view of the cooking tool of FIGS. 4A-B detailing example dimensions of the various structures of the cooking tool.

FIG. 5A is a front perspective view of a cooking tool packaging arrangement that includes three cooking tools packaged together, such that a first cooking tool with handles is nested within a second cooking tool without handles and a third cooking tool without handles.

FIG. 6 is a cross-sectional view of the nested cooking tool packaging arrangement of FIGS. 5A-F depicting details of the suction cup base with legs and feet for attachment to a placement surface.

PARTS LISTING

Figure 2B:
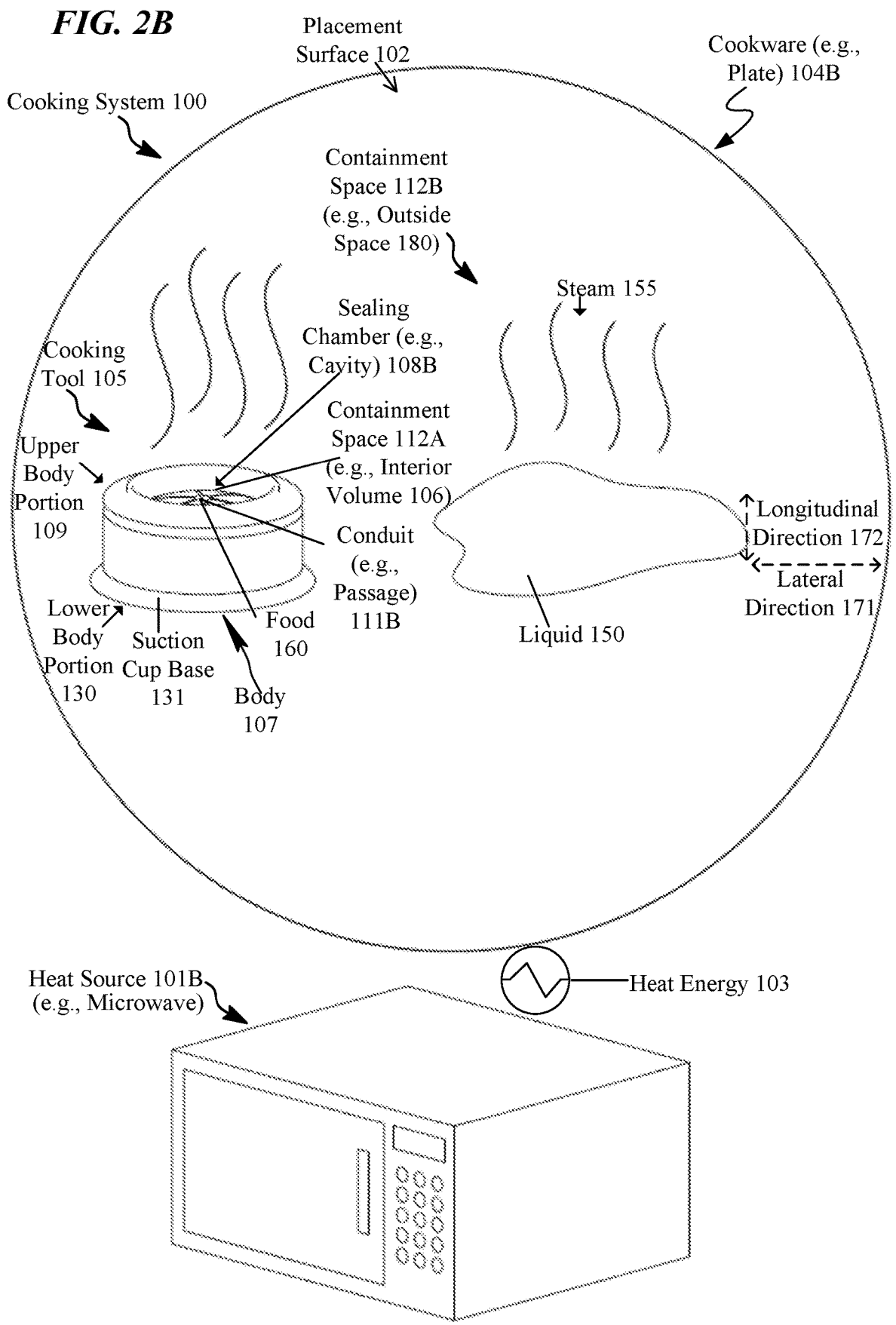

100 Cooking System
101 Heat Source
101A Stove
101B Microwave
102 Placement Surface
103 Heat Energy
104 Cookware
104A Pan
104B Plate
105 Cooking Tool
105A First Cooking Tool
105B Second Cooking Tool
105C Third Cooking Tool
106 Interior Volume
107 Body
108 Sealing Chamber
108A Well
108B Cavity
109 Upper Body Portion
111A-S Conduit
111A-R Peripheral Conduit
111S Central Conduit
112A Interior Containment Space
112B Exterior Containment Space
130 Lower Body Portion
131 Suction Cup Base
150 Liquid
155 Steam
160 Food
160A Pizza
160B Panini
171 Lateral Direction
172 Longitudinal Direction
180 Outside Space
305A-F Boiling Flaps
310 Body Lateral Portion
315 Body Shoulder Portion
320 Raised Lip
325 Protruding Edge
330 Central Upper Body Portion
334A-B Leg
335A-B Foot
405A-B Handle
406A-B Aperture
500 Cooking Tool Packaging Arrangement

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "substantially" means that the parameter value or the like varies up to ±10% from the stated amount. When used in connection with a direction, "substantially longitudinally" means generally vertical to the point of reference, for example, in a substantially orthogonal or perpendicular direction that is 81°-99° to the point of reference. For example, when used in connection with a direction, "substantially laterally" means generally horizontal to the point of reference, for example, in a substantially sideways or parallel direction, that is 162°-198° to the point of reference.

The orientations of the cooking system, cooking tool, placement surface, cookware, heat source, associated components and/or any complete devices incorporating a cooking tool such as shown in any of the drawings, are given by way of example only, for illustration and discussion purposes. In operation for a particular cooking system or technique, a cooking tool may be oriented in any other direction suitable to the particular application of the cooking tool, for example upright, sideways, or any other orientation. Also, to the extent used herein, any directional term, such as lateral, longitudinal, up, down, upper, lower, top, bottom, and side, are used by way of example only, and are not limiting as to direction or orientation of any cooking system and cooking tool or component of a cooking tool constructed as otherwise described herein. Reference now is made in detail to the examples illustrated in the accompanying drawings and discussed below.

FIGS. 1A-B are perspective views of a cooking system 100 depicting components of the cooking system 100, including: a cookware 104 that includes a placement surface 102 and a cooking tool 105 that has a well 108A filled with liquid 150 positioned on the placement surface 102 of the cookware 104. The cooking system 100 further includes a heat source 101 to channel heat energy 103 to the cookware 104 and the cooking tool 105.

FIGS. 2A-B are perspective views of the cooking system 100 like that of FIGS. 1A-B, in which the cooking tool 105 has a cavity 108B filled with food 160 positioned on and coupled (e.g., sealed) to the placement surface 102. In FIGS. 1A and 2A, the heat source 101 is a stove 101A and the cookware 104 is a pan 104A. In FIGS. 1B and 2B, the heat source 101 is a microwave 101B and the cookware 104 is a plate 104B. The heat source 101 can be powered by electricity, gas, fire, solar, or other suitable energy source.

Cooking tool 105 can be formed of a suitable food-grade and safe material, such as food grade silicone, nitrile, and can be manufactured via a molding process. Cooking tool 105 includes an interior volume 106, a body 107 that includes a lower body portion 130 for coupling to a placement surface 102, and an upper body portion 10. The upper body portion 109 includes at least one conduit 111A-S. The lower body portion 130 includes a suction cup base 131 for coupling to the placement surface 102 to form a sealing chamber 108 to seal a liquid 150 or food 160 inside the interior volume 106.

The various components of the cooking tool 105, such as the body 107 and handles 405A-B, disclosed herein can be manufactured using a variety of techniques, including molding, machining, milling, casting, plating, or a combination thereof. For example, the body 107, including the upper body portion 109, lower body portion 130, body shoulder portion 315, etc., and parts thereof can be formed using molding to form the cooking tool 105 as a single integral piece. Alternatively, in some examples, the components of the cooking tool 15, including the upper body portion 109, lower body portion 130, body shoulder portion 315, etc., and parts thereof, can be manufactured separately and then mechanically fastened together. Secondary machining operations, including laser ablation, can be used, for example, to create the desired shape of the body 107 and/or form structures by burning away or otherwise removing undesired portions, for example, to form the conduits 110A-S and boiling flaps 305A-F. In some examples, the handles 405A-B can be casted and the body 107 can be molded separately and then can be mechanically fastened together.

Sealing chamber 108 includes the interior volume 106, such as an empty space or void, inside of the cooking tool 150 that can be filled with liquid 150 or food 160. Sealing chamber 108 and the interior volume 106 can vary in size so that food 160, such as pancake batter, cake batter, or an egg can be placed inside the interior volume 106 to cook inside the sealing chamber 108, as shown in FIGS. 2A-B. As shown in FIGS. 3A-I and 4A-J, sealing chamber 108 is substantially enclosed on all sides, e.g., on the bottom by the placement surface 102 and suction cup base 131, the side by the body lateral portion 310, and on the top by the central upper body portion 330.

Cookware 104 can include a cooking vessel or container, e.g., a skillet, a pan, a pot, a plate, etc., made of metal, ceramic, plastic, glass, or other suitable materials utilized for cooking food 160. The placement surface 102 is a portion of the cookware 104 on which the cooking tool 105 is placed. Placement surface 102 can include a substantially flat and non-porous surface that is a portion of a cookware 104. For example, heat source 103 can include a heating element, such as a stovetop, microwave, conventional oven, convection oven, toaster oven, hot plate, etc. When the placement surface 102 is exposed to heat energy 103 channeled from the heat source 101 and the well 108A is filled with liquid 150 (e.g., water, lemon juice, or other cooking fluid), the cooking tool 105 generates steam 155 to cook the food 160.

Food 160 can include a pizza 160A, a panini 160B, a bagel, an omelet, a cake, a steamed brownie, or a poached egg, for example. The cavity 108B of the cooking tool 105 can include a relatively large interior volume 106 compared to the well 108A for allowing food 160, such as a cake, quiche, or omelet, to be cooked inside the cooking tool 105. Hence, the food 160 can be cooked through generated steam 155, which is produced by pouring cooking batter for the food 160 within the interior volume 106 of the cooking tool 105, pouring liquid 150 in the outside space 180 of the placement surface 102, and exposure to heat energy 103 from the heat source 101.

When cooking a pizza 160A, a panini 160B, a grilled sandwich, etc., the hot placement surface 102 of the cookware 104 exposed to the heat energy 103 will create a crispy crust, and the generated steam 155 will melt the cheese and refresh and heat the toppings. For example, if the food 160 is a bagel, the cooking tool 105 puts moisture from the generated steam 155 back into the bagel to provide the bagel with an out of the oven fresh taste. Cooking tool 105 can be utilized in the cooking system 100 and a cooking technique to perfectly poach an egg in under 5 minutes. In an example mode of use of the cooking system 100, the user places the placement surface 102 of cookware 104 (e.g., pan 104A) on the heat source 101 (e.g., stove 101A) and heats the placement surface 102 for 1 minute on a high heat setting. The user presses the cooking tool 105 onto the placement surface 102 and pours liquid 150 inside the well 108A of the cooking tool 105, as shown in FIG. 1A. Alternatively, the user can pour liquid outside 150 outside of the cooking tool 105 onto the placement surface 102 of the pan 104A, as shown in FIG. 2A.

In the FIG. 1A example, the liquid 150 immediately starts to generate steam 155. The user places the food 160 to be cooked (e.g., slice of pizza 160A or panini 160B) in the outside space 180 of the placement surface 102 where there is no liquid 150. The user can cover the placement surface 102 with a lid and turns a burner of the stove 101A to a medium/low heat setting and allows the generated steam 155 and heat energy 103 to cook the food 160 for the next 4 minutes. The volume of liquid 150 poured in the well 108A of the cooking tool 105 determines the amount of generated steam 155 and the duration of steam 155 present on or within the placement surface 102 to steam the food 160.

Because the cooking tool 105 includes a well 108A to form an interior containment space 112A inside the cooking tool 105, the generated steam 155 helps carry the heat energy 103 to the food 160 in an exterior containment space 112B (e.g., outside space 180). This simultaneously cooks food 160 via the steam 155 while preventing direct contact of the liquid 150 with the food 160, which would otherwise render the food 160 soggy. Food 160 cooked in steam 155 retains moisture better and has numerous health benefits. If the cookware 104 includes a lid/cover, then the lid/cover can be placed on top of the cookware 104 to further improve the freshness of the food 160 by further confining the generated steam 155 within the cookware 104. Although the body 107 of the cooking tool 105 is depicted as ring-shaped or cylindrical, the body 107 can be formed into a variety of shapes. In addition to being a circular or other round shape in two-dimensional space, the body 107 can be oval, square, rectangular, triangular, or another polygon shape. For example, the body 107 can be a polyhedron (e.g., cuboid) in three-dimensional space.

Figure 3A:
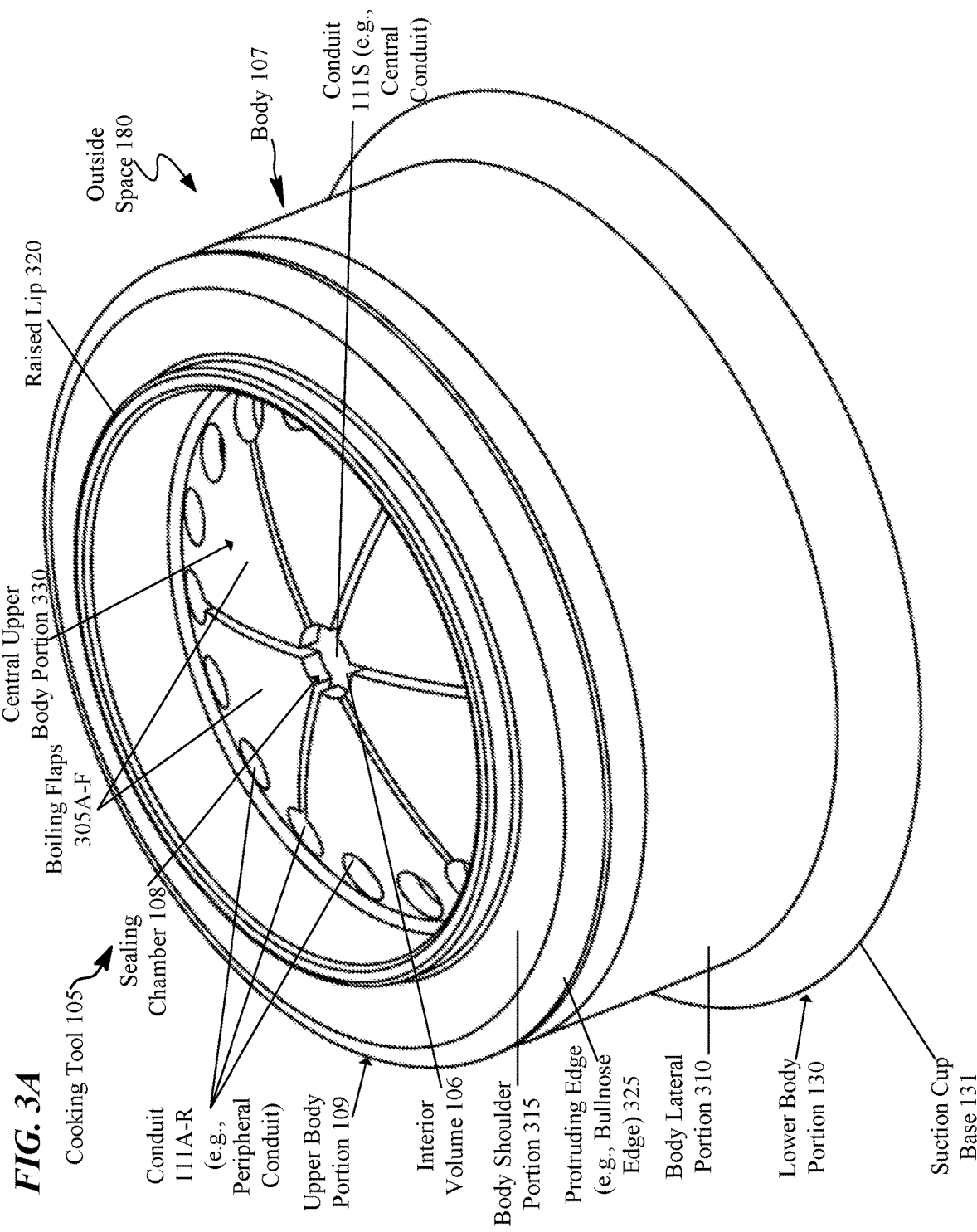
FIG. 3A is an isometric view of the cooking tool of FIGS. 1A-B and 2A-B depicting components of the cooking tool, including an interior volume, a lower body portion with a suction cup base, and an upper body portion.

Returning to the example, the body 107 is depicted as a ring-shaped structure, bounded by two concentric circles. The bottom of the body 107 includes a suction cup base 131 that can be sealed, e.g., vacuum attached, to the placement surface 102. In the example of FIG. 3A, when viewed from the outside, the suction cup base 131 is depicted as a ring-shaped sealing membrane gasket that outlines the cylindrical profile of the body 107. But the sealing membrane of the suction cup base 131 can be any suitable shape, so long as the shape of the suction cup base 131 creates a seal to form the sealing chamber 108 in response to being coupled to the placement surface 102. In FIGS. 1A and 2A, when cooking tool 105 is placed on the placement surface 102 of a pan 104A over the stove 101A, the cooking tool 105 releases steam 155, and infuses moisture into the food 160 to enhance flavor. In FIGS. 1B and 2B, when the cooking tool 105 placed on the placement surface 102 of a plate 104B and is placed inside the microwave 101B, the cooking tool 105 releases steam 155, and infuses moisture in the food 160.

In FIGS. 1A-B, the food 160A-B is on the placement surface 102 and located exterior to the interior volume 106 in an outside space 180 that resides outside the cooking tool 105. The lower body portion 130 is positioned on the placement surface 102 to form the sealing chamber 108, the sealing chamber 108 being a well 108A filled with liquid 150 in the interior volume 106. The suction cup base 131 is coupled to the placement surface 102 to enclose the liquid 150 between the placement surface 102 and the upper body portion 109 to form the well 108A filled with the liquid 150 in the interior volume 106. The upper body portion 109 releases steam 155 generated from the liquid 165 in response to channeled heat energy 103 from the heat source 101A-B. The at least one conduit 111A-S includes at least one vent hole to release the generated steam 155 and allow flow of the generated steam 155 out of the interior volume 106 to the outside space 180 to cook the food 160A-B placed on the placement surface 102. The cooking tool 105 is oriented substantially laterally (e.g., in the lateral direction 171) to the food 160A-B on the placement surface 102.

Generally described, cooking tool 105 creates a division between the liquid 150 and the food 160 in the cookware 104 and creates two containment spaces 112A-B. In FIGS. 1A-B, an interior containment space 112A is the well 108A for the liquid 150 inside the cooking tool 105 and the exterior containment space 112B is the outside space 180 for the food 160 outside of the cooking tool 105 in the outside space 180 of the cookware 104. In FIGS. 2A-B, the interior containment space 112A is a cavity 108B for the food 160 inside the cooking tool 105 and the exterior containment space 112B is for the liquid 150 in the outside space 180 of the placement surface 102 of the cookware 104. The divided interior containment space 112A and exterior containment space 112B keep the liquid 150 from coming into direct contact with the food 160 for the duration of the cooking time. Traditionally, food can be steam cooked by being indirectly exposed to steam while being cooked by heat. Advantageously, the cooking system 100 and the cooking tool 105 enable food 160 to be cooked without direct contact with liquid 150, while the food 160 is simultaneously directly exposed to the generated steam 155 and simultaneously cooked by the channeled heat energy 103 from the heat source 101. Utilizing the coking system 100 and the cooking tool 105, the channeled heat energy 103 touches desired portions of the food 160, such as the crust of the pizza 160A, while the generated steam 155 simultaneously touches the toppings on the pizza 160A.

In the cooking system, 100, the cooking tool 105 is sealed on the placement surface 102 of the cookware 104 (e.g., skillet 104A) and can be placed over any type of heat source 101 (e.g., stove 101A) or inside a microwave 101B. One of the interior containment space 112A or the exterior containment space 112B is filled with liquid 150 and other is filled with food 160. Upon exposure of the liquid 150 to the channeled heat energy 103 from the heat source 101, the liquid 150 evaporates into steam 155 to trap the moisture content into the food 160, thereby refreshing moisture content of the food 160. Suction cup base 131 of the cooking tool 105 blocks direct contact of the liquid 150 with the food 160 to prevent sogginess during cooking.

Returning to the example of FIGS. 2A-B, the liquid 150 is on the placement surface 102 and located exterior to the interior volume 106 in an outside space 180 that resides outside the cooking tool 105. The lower body portion 130 is positioned on the placement surface 102 to form a sealing chamber 108, the sealing chamber 108 being a cavity 108B filled with food 160 in the interior volume 106. The suction cup base 131 is coupled to the placement surface 102 to seal out the liquid 150 on the placement surface 102 and to form the cavity 108B filled with the food 160 in the interior volume 106. The upper body portion 109 flows steam 155 generated from the liquid 150 in response to channeled heat energy 103 from the heat source 101A-B. More specifically, an open space (e.g., upper longitudinal portion of the interior volume 106) of the upper body portion 109 allows exposure of the food 160 inside the cavity 108B to the flow of steam 155 generated from the liquid 150 in response to channeled heat energy 103 from the heat source 101A-B. The at least one conduit 111A-S includes at least one passage to flow (e.g., convey) the generated steam 155 and allow passage of the generated steam 155 into the interior volume 106 from the outside space 180 to cook the food 160 filling the cavity 108B. The cooking tool 105 is oriented substantially laterally (e.g., in the lateral direction 171) to the liquid 150 on the placement surface 102.

Figure 3B:
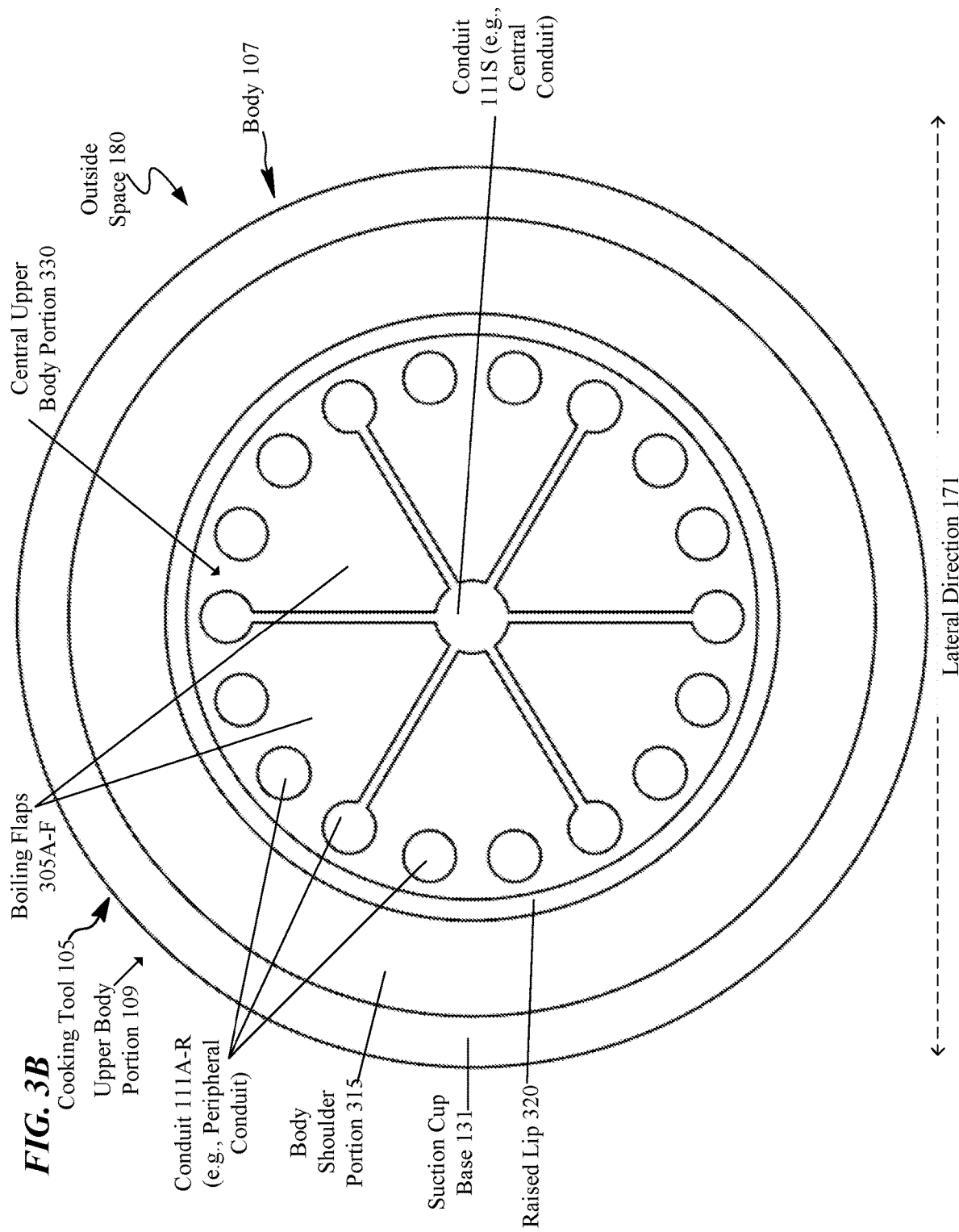
FIG. 3B is a top view of the cooking tool of FIG. 3B showing details of the upper body portion, including conduits and boiling flaps.

FIG. 3A is an isometric view of the cooking tool 105 of FIGS. 1A-B and 2A-B depicting components of the cooking tool 105, including an interior volume 106, a lower body portion with a suction cup base 131, and an upper body portion 109. FIG. 3B is a top view of the cooking tool 105 of FIG. 3A showing details of the upper body portion 109, including conduits 111A-S and boiling flaps (e.g., fins) 305A-F. The at least one conduit 111A-S is an opening formed in the upper body portion 109.

As shown in FIG. 3A, the upper body portion 109 includes at least one boiling flap 305A-F to block the liquid 150 in a boiling state from splashing outside of the interior volume 106. The at least one conduit 111A-S is an opening formed in the at least one boiling flap 305A-F. The upper body portion 109 includes a raised lip 320 located peripherally to the at least one boiling flap 305A-F. The raised lip 320 abuts the at least one boiling flap 305A-F and slopes upwards from the at least one boiling flap 305A-F. The raised lip 320 and boiling flaps 305A-F advantageously prevent the liquid 150 from spilling over from the well 108A of the cooking tool 105.

Figure 3C:
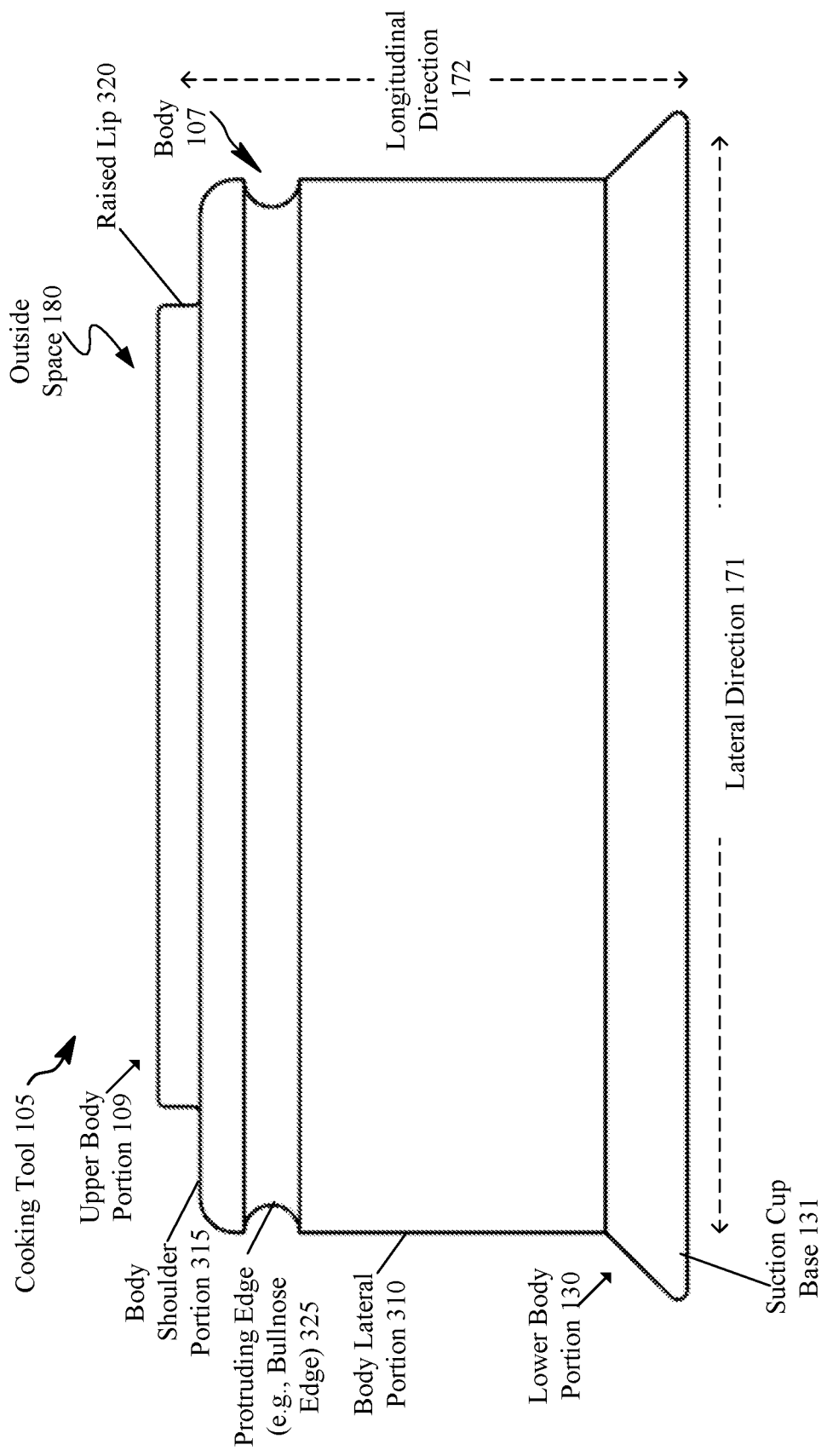
FIG. 3C is a side view of the cooking tool of FIGS. 3A-B showing details of the upper body portion, including a protruding edge and a raised lip.

As shown in FIG. 3B, the upper body portion 109 can include a central upper body portion 330. For example, the raised lip 320 substantially longitudinally extends (e.g., in the longitudinal direction 172) upwards from the central upper body portion 330, as shown in FIG. 3C. Returning to FIG. 3B, the central upper body portion 330 includes a plurality of conduits 111A-S (e.g., nineteen). The plurality of conduits 111A-S include at least one central conduit 111S (e.g., one) and a plurality of peripheral conduits 111A-R (e.g., eighteen). The central upper body portion 330 includes an aspherical, spherical, planar surface, or a combination thereof. The upper body portion 109 further includes a plurality of boiling flaps 305A-F (e.g., six) surrounding the central conduit 111S. The peripheral conduits 111A-R are formed in the plurality boiling flaps 305A-F. Each of the boiling flaps 305A-F include at least one respective peripheral conduit 111A-R. In the example of FIG. 3A, the central conduit 111S is formed at the intersection of the plurality of boiling flaps 305A-F. The boiling flaps 305A-F radially extend from the central conduit 111S. The peripheral conduits 111A-R are annularly arranged around the central conduit 111S.

In some examples, boiling flaps 305A-F can be eliminated and the central upper body portion 330 can be a surface that includes conduits 111A-S formed therein. For example, boiling flaps 305A-F may not be needed if the cavity 108B is filled with food 160. Alternatively, boiling over of the liquid 150 may be a non-issue if the interior volume 106 is very large and the well 108A is only partially (e.g., half or less) filled with liquid 150 and the remaining half or more of the well 108A is empty of the liquid 150.

FIG. 3C is a side view of the cooking tool 105 of FIGS. 3A-B showing details of the upper body portion 109, including a protruding edge 325 and a raised lip 320. The body 107 further includes a body lateral portion 310 that extends from the suction cup base 131 to the upper body portion 109. The body 107 further includes a body shoulder portion 315. The body shoulder portion 315 extends between the body lateral portion 310 and intersects the upper body portion 109. The body shoulder portion 315 includes a protruding edge 325 that abuts the upper body portion 109.

The protruding edge 325 includes a bullnose edge for grabbing or holding by a user. The protruding edge 325 can be a variety of shapes that facilitate handling or gripping by a user, such as a reverse bevel, shark nose, etc. In the depicted example, the body 107 is circular or oval shaped in two-dimensions and cylindrical-shaped in three-dimensions. Hence, the bullnose edge also has a circular profile and thus is circumferentially arranged around the upper body portion 109. As shown, the bullnose edge can be continuous and curves around the upper body portion 109. In an alternative example, the body 107 is a polygon shape (e.g., cuboid) or a portion thereof; thus, the bullnose edge can be discontinuous, e.g., linearly arranged on various sides (e.g., opposing sides) of the upper body portion 109.

FIG. 3D is a cross-sectional view of the cooking tool 105 of FIGS. 3A-C depicting details of the sealing membrane of the suction cup base 131 with legs 334A-B and feet 335A-B for attachment and sealing to the placement surface 102. The suction cup base 131 includes a sealing membrane that comprises a plurality of legs 334A-B and a plurality of feet 335A-B for coupling to the placement surface 102 to form the sealing chamber 108. A respective foot 335A-B is coupled to a distal end of a respective leg 334A-B for attachment to the placement surface 102. The legs 334A-B and the feet 335A-B can be formed of a flexible and resilient material (e.g., food grade silicon) so that the legs 334A-B and the feet 335A-B can bend or deform to seal to the placement surface 102. In the depicted example, the body 107 is circular or oval shaped; therefore, the plurality of legs 334A-B and the plurality of feet 335A-B are continuously arranged around the circular or oval shaped body 107. In an alternative example, the body 107 is a polygon shape or a portion thereof; thus, the plurality of legs 334A-B and the plurality of feet 335A-B are discontinuously arranged around the polygon or the portion thereof shaped body 107 and in aggregate form the sealing chamber 108.

The cooking tool 105 is designed to suit the high temperature range that the liquid 150 or food 160 inside the sealed interior volume 106 (e.g., sealing chamber 108) of the body 107 is subjected to by the heat energy 103 channeled from the heat source 101. The shape and thickness of the suction cup base 131 is likewise designed for the application. The suction cup base 131 is a flexible material that surrounds and has an opening centered about the proximal end of the interior volume 106. Although other shapes of the suction cup base 131 may be used, the example shown uses a flexible membrane as the suction cup base 131. Suction cup base 131 can be a molded C-ring with a certain geometric profile and varying wall thickness to optimize the sealing capability of the top and bottom sections (the legs 334A-B and feet 335A-B).

Compression of the suction cup base 131 improves the sealing of fluid 150 within the well 108A or food 160 within the cavity 108B implemented by the cooking tool 105. For example, the suction cup base 131 is formed of a molded C-ring or suitably shaped material and is sufficiently compressible. An example of a suitable flexible material is food-grade silicon, nitrile, although other rubber-based or flexible plastics may be suitable to form the suction cup base 131 and other parts of the cooking tool 105. Alternatives to the membrane design of the suction cup base 131, include for example, one or more O-rings or other alternative shape that is still located around the perimeter of the interior volume 106 at the bottom of the cooking tool 105.

Figure 3E:
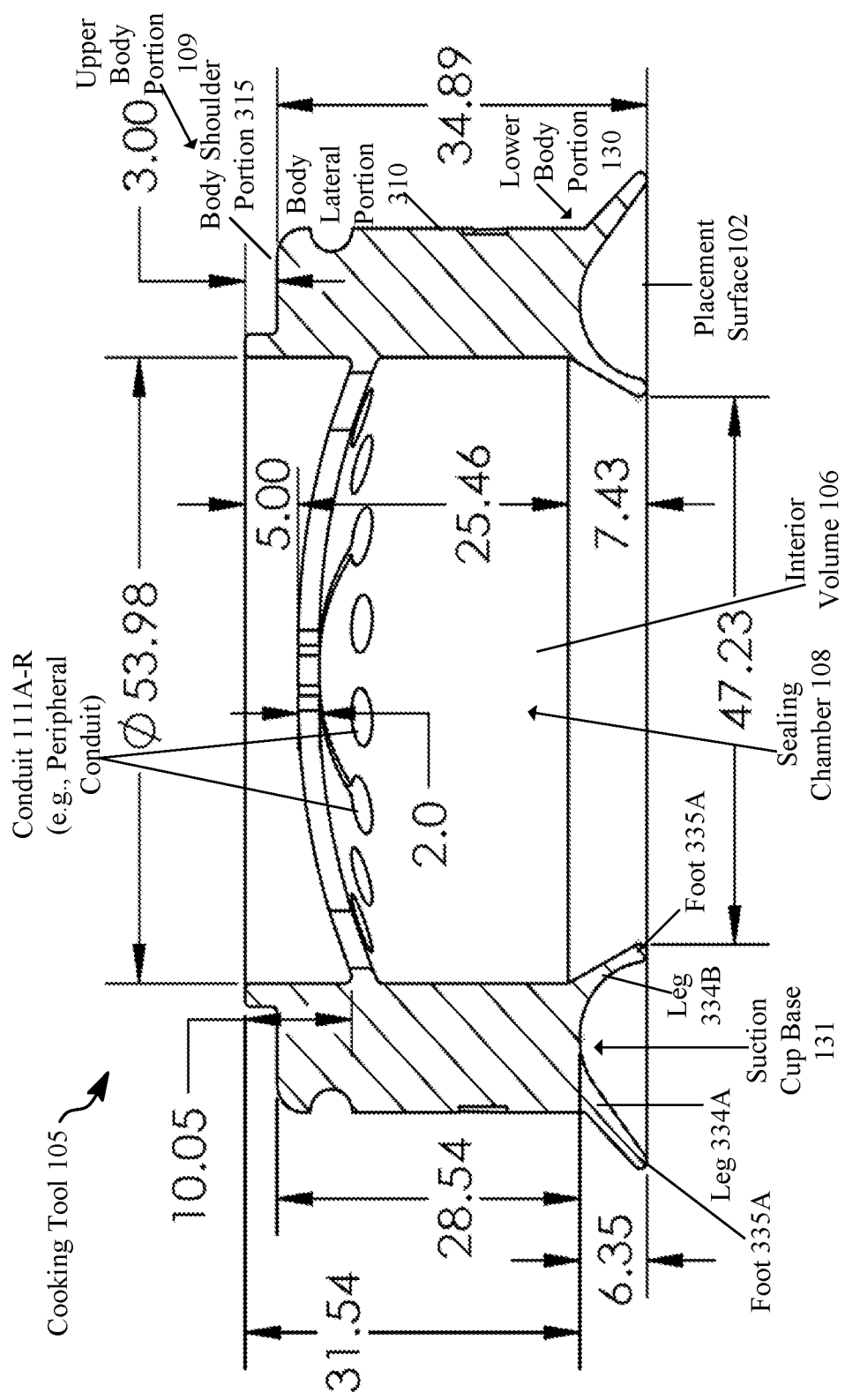
FIG. 3E is the same cross-sectional view of the cooking tool of FIG. 3D detailing example dimensions of the various structures of the cooking tool.
Figure 3F:
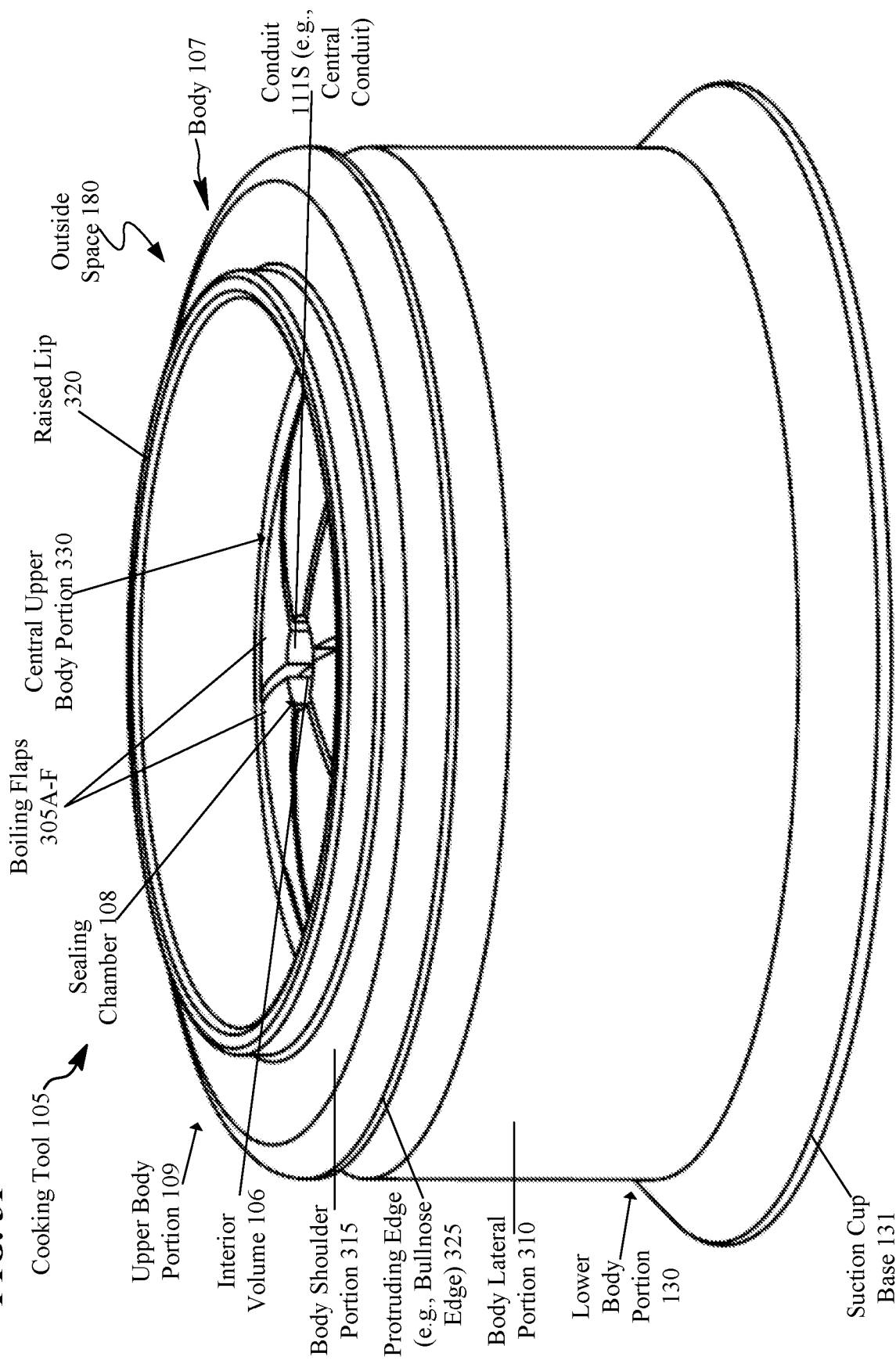
FIG. 3F is a front perspective view of the cooking tool of FIGS. 3A-E depicting a shape of the body of the cooking tool as a ring-shaped structure shown in solid lines.
Figure 3G:
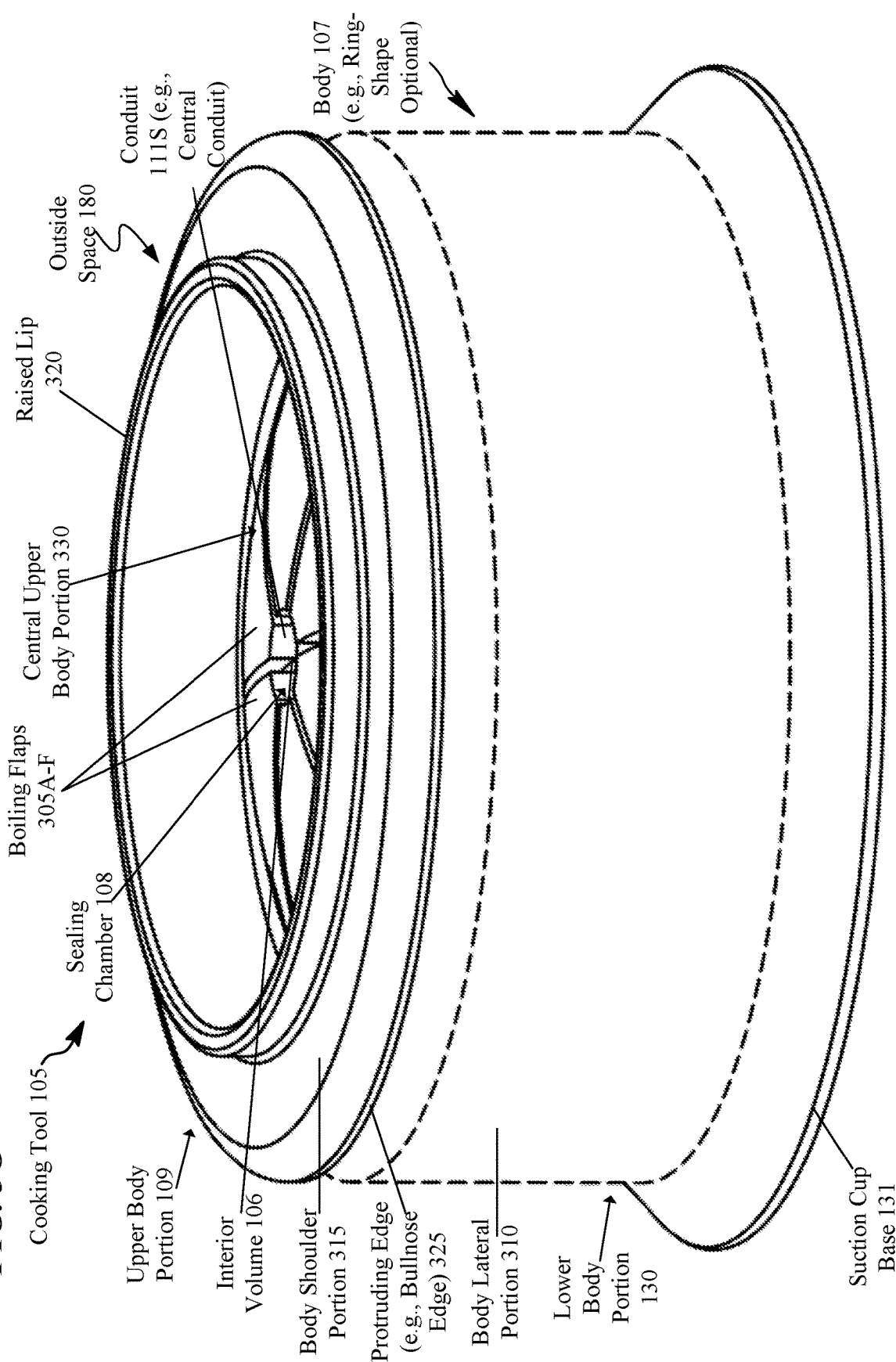
FIG. 3G is another front perspective view of the cooking tool like that of FIG. 3F, but depicting the shape of the body of the cooking tool in broken lines to indicate that the shape can vary.

FIG. 3E is the same cross-sectional view of the cooking tool of FIG. 3D detailing example dimensions of the various structures of the cooking tool 105. FIG. 3F is a front perspective view of the cooking tool of FIGS. 3A-E depicting a body 107 of the cooking tool 105. In FIG. 3F, the body 107 is shaped as a ring-shaped structure shown in solid lines. FIG. 3G is another front perspective view of the cooking tool 105 like that of FIG. 3F. In FIG. 3G, a shape of the body 107 is depicted in broken lines (e.g., the body lateral portion 110) to indicate that having a ring-shaped body 107 is optional. Although only the body lateral portion 310 of the body 107 is depicted in broken lines, other portions of the body 107 (e.g., upper body portion 109, lower body portion 130, and body shoulder portion 315) along with the body lateral portion 310 can be formed into any desired shape of the body 107. Moreover, the portions of the body 107 can be of different shapes, for example the suction cup base 131 can have a ring-shape profile while the body lateral portion 310 can be a polygon shape profile.

Figure 3H:
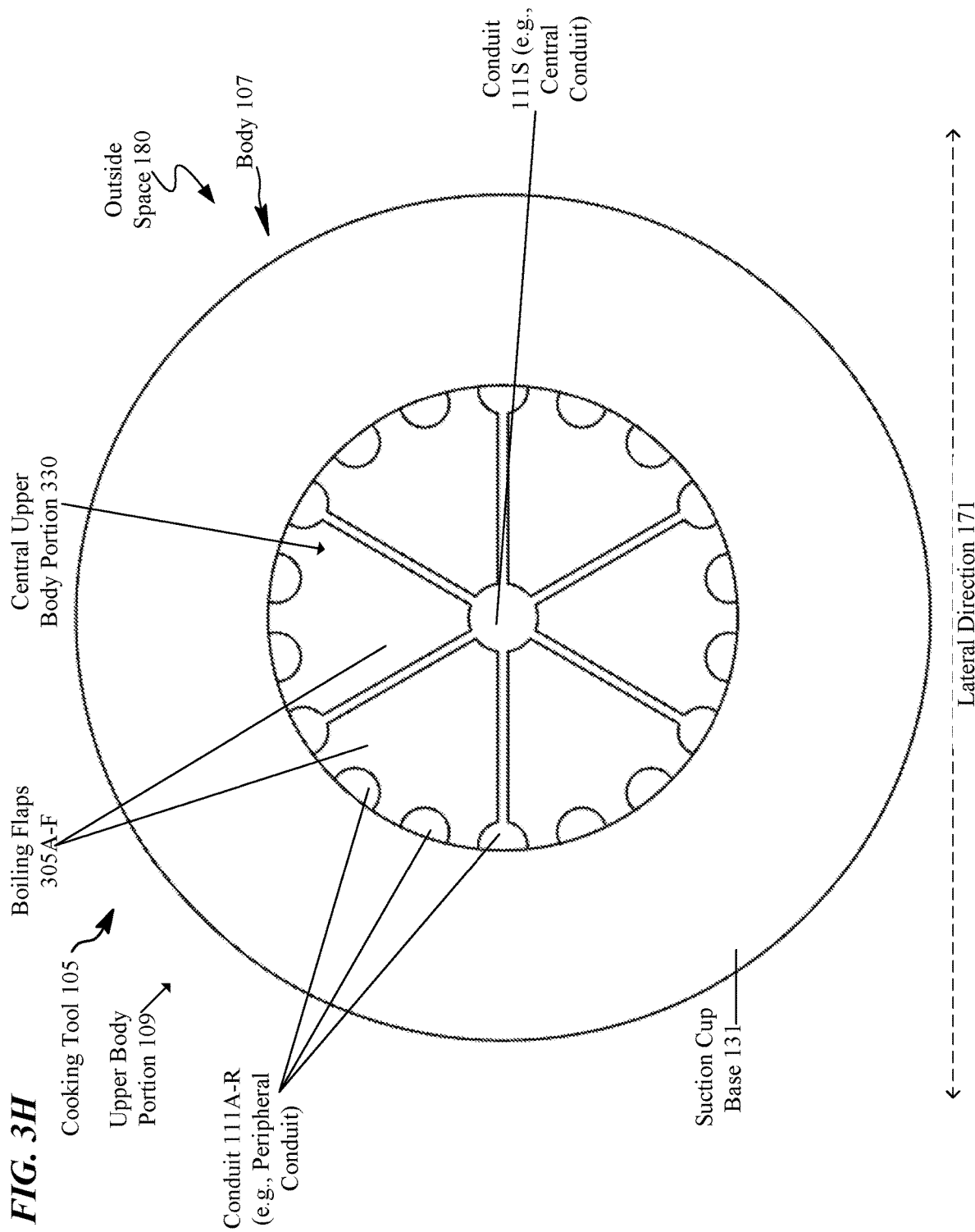
FIG. 3H is a bottom view of the cooking tool of FIGS. 3A-G depicting the boiling flaps, central conduit, and peripheral conduits structures in solid lines.
Figure 3I:
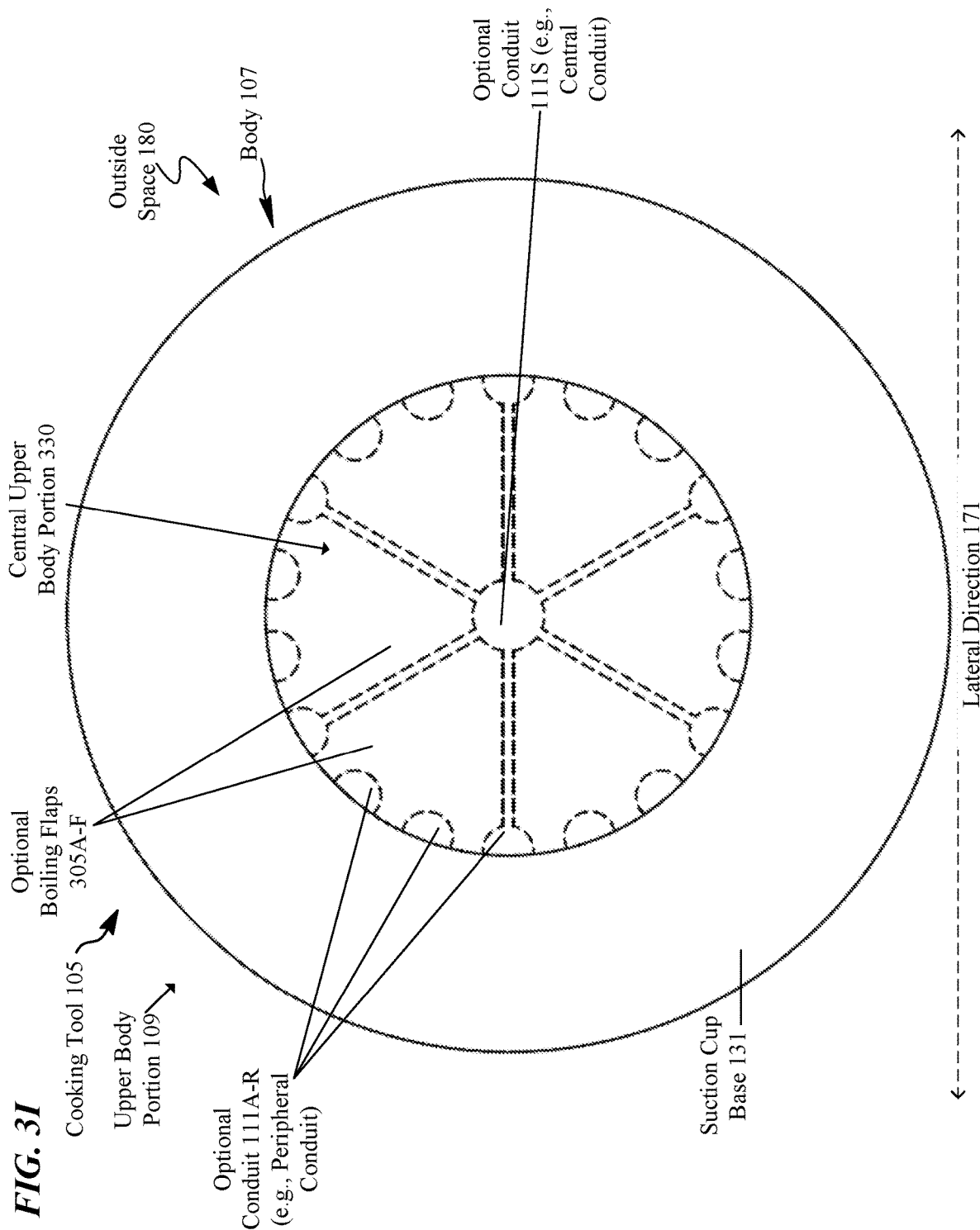
FIG. 3I is another bottom view of the cooking tool like that of FIG. 3H, but depicting the boiling flaps, central conduit, and peripheral conduits of the cooking tool as optional in broken lines.

FIG. 3H is a bottom view of the cooking tool 105 of FIGS. 3A-G depicting the boiling flaps 305A-F, central conduit 111S, and peripheral conduits 111A-R structures in solid lines. FIG. 3I is another bottom view of the cooking tool 105 like that of FIG. 3H. In FIG. 3I, the boiling flaps 305A-F, central conduit 111S, and peripheral conduits 111A-R of the cooking tool 105 are depicted in broken lines to indicate that the boiling flaps 305A-F and arrangement of the central conduit 111S and peripheral conduits 111A-R are optional and can vary. For example, the central upper body portion 330 does not need to include boiling flaps 305A-F and can include a single conduit 111A, two conduits 111A-B, three conduits 111-A-C, etc. The conduit(s) 111x can be located anywhere in the central upper body portion 330, for example, in a middle of the central upper body portion 330 (e.g., like central conduit 111S), on a periphery (e.g., like peripheral conduits 111A-R), or in an intermediate area of the central upper body portion 330 (e.g., between peripheral conduits 111A-R and central conduit 111S).

Figure 4A:
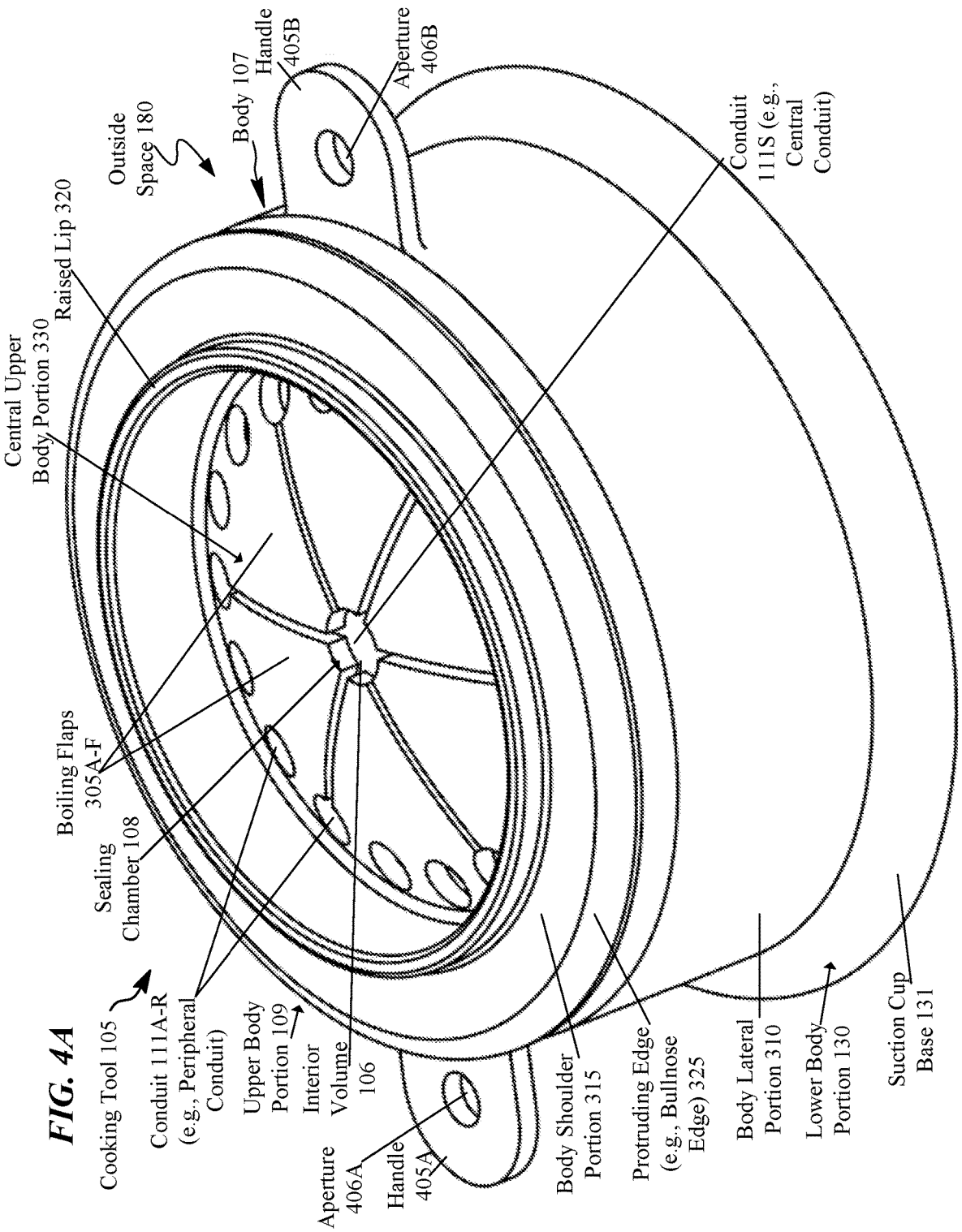
FIG. 4A is an isometric view of the cooking tool of FIGS. 1A-B and 2A-B and like that of FIG. 3A, and further including handles.
Figure 4B:
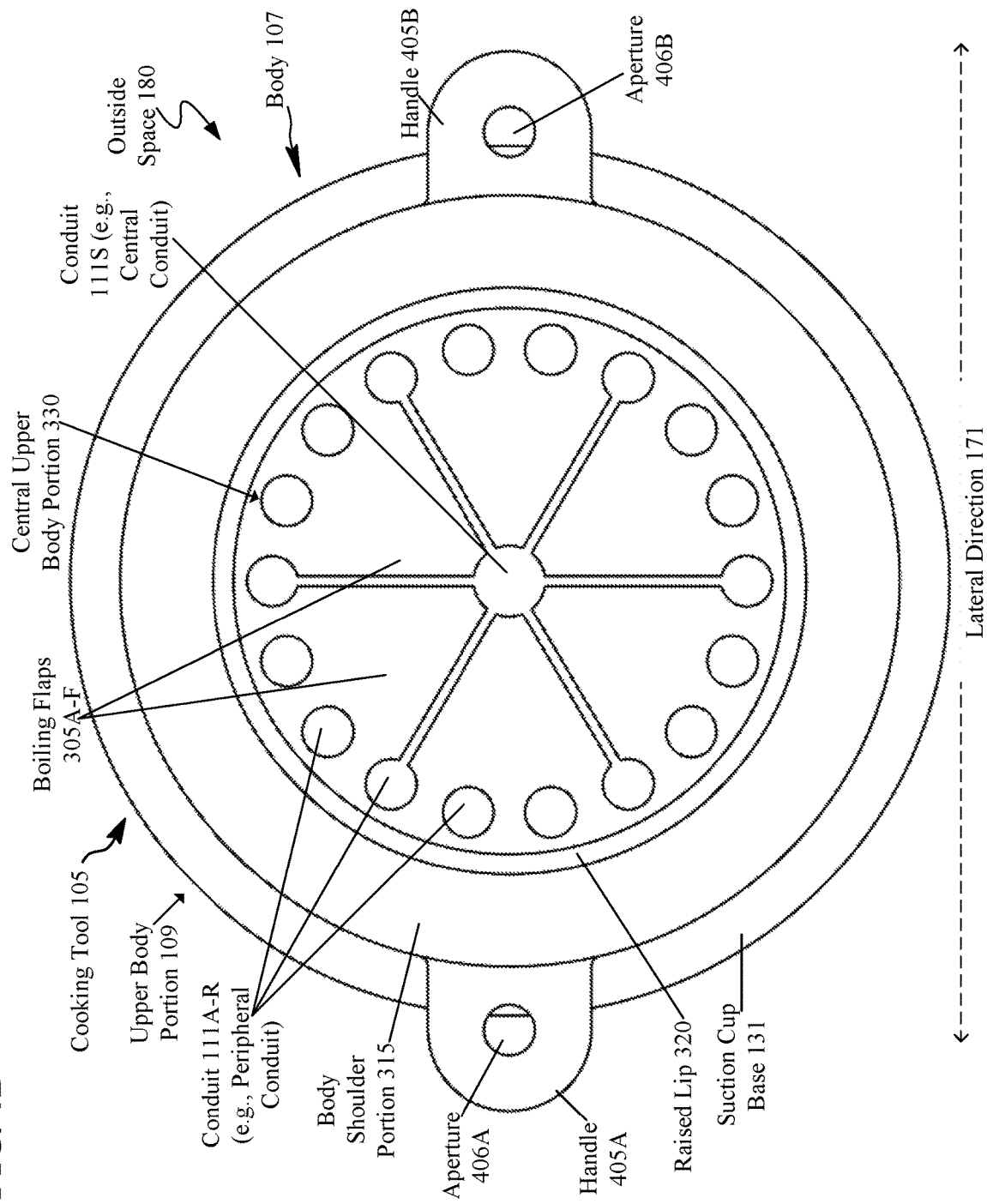
FIG. 4B is a top view of the cooking tool of FIG. 4A and like that of FIG. 3B, but with handles.

FIG. 4A is an isometric view of the cooking tool 105 of FIGS. 1A-B and 2A-B and like that of FIG. 3A, and further including a plurality of handles 405A-B (e.g., two). FIG. 4B is a top view of the cooking tool 105 of FIG. 4A and like that of FIG. 3B. As shown, the cooking tool 105 can include at least one handle 405, although two handles 405A-B are depicted in the example of FIGS. 4A-B. The user can use the handles 405A-B to remove the cooking tool 105 from the placement surface 102 of the cookware 104 upon cooking completion. As shown, each of the handles 405A-B can include a respective aperture 406A-B formed therein for ease of handling. Apertures 406A-B can be utilized if indirect contact with the handles 405A-B is desired, for example, apertures 406A-B enable insertion of a utensil therein. To avoid being subjected to heat exposure on skin tissue, a user may insert the utensil into a respective aperture 406A-B and then lift the cooking tool off the placement surface 102.

Because the protruding edge 325 can be utilized by the user to lift and otherwise handle the cooking tool 105, the handles 405A-B are optional. For example, the handles 405A-B can be eliminated to reduce the bulkiness of the cooking tool 105 and create a leaner profile. Multiple sizes (e.g., three sizes) of cooking tools 105A-C can be nested within each other during packaging and then shipped together. A drawback of eliminating the handles 405A-B and relying on the protruding edge 325 of the body shoulder portion 315 for user handling is that the protruding edge 325 is typically formed of a higher thermally conductive material compared to the handles 405A-B. Thus, the protruding edge 325 will become hotter compared to the handles 405A-B during cooking.

The handles 405A-B can be formed of any suitable heatproof or heat resistant material. Material forming the handles 405A-B are generally less thermally conductive and more heat resistant than the material forming the body 407 for ease of handling by the user. Handles 405A-B can be formed of metal, plastic, silicon, nitrile, rubber, or a combination thereof. In one example, the handles 405A-B are formed of food grade silicon that is similar to the material utilized to form the body 107. The food grade silicon to form the body 107 can be of a first type that is of a different hardness (e.g., shore A hardness) compared to a second type of food grade silicon to form the handles 405A-B. For example, the first type of food grade silicon material forming the body 107 is less hard compared to the second type of food grade silicon material forming the handles 405A-B.

The number of handles 405A N can vary, e.g., the cooking tool 105 can include one, two, three, four, or more handles 405A-N. In the depicted example, the two handles 405A-B are discontinuous and extend substantially laterally (e.g., in the lateral direction 171) from the body lateral portion 310. However, in another example, because the body 107 is circular or oval shaped, the cooking tool 105 can include a single handle 405 that is continuous and curves around the body lateral portion 310. In an alternative example, the body 107 is a polygon shape or a portion thereof; thus, the handles 405A-B can be linearly arranged on opposing sides of the body lateral portion 310.

Figure 4D:
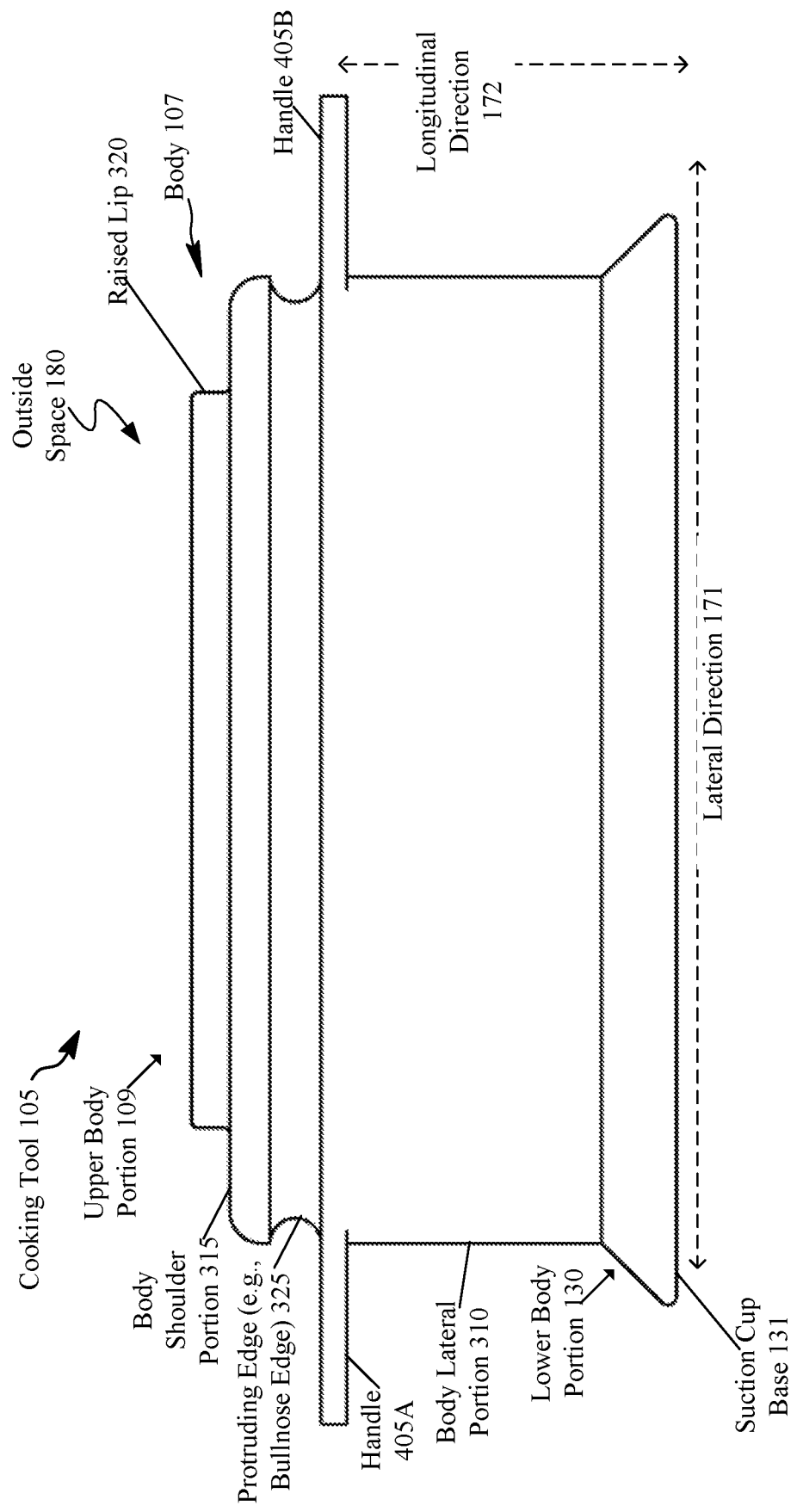
FIG. 4D is a side view of the cooking tool of FIGS. 4A-C and like that of FIG. 3C, but with handles.
Figure 4E:
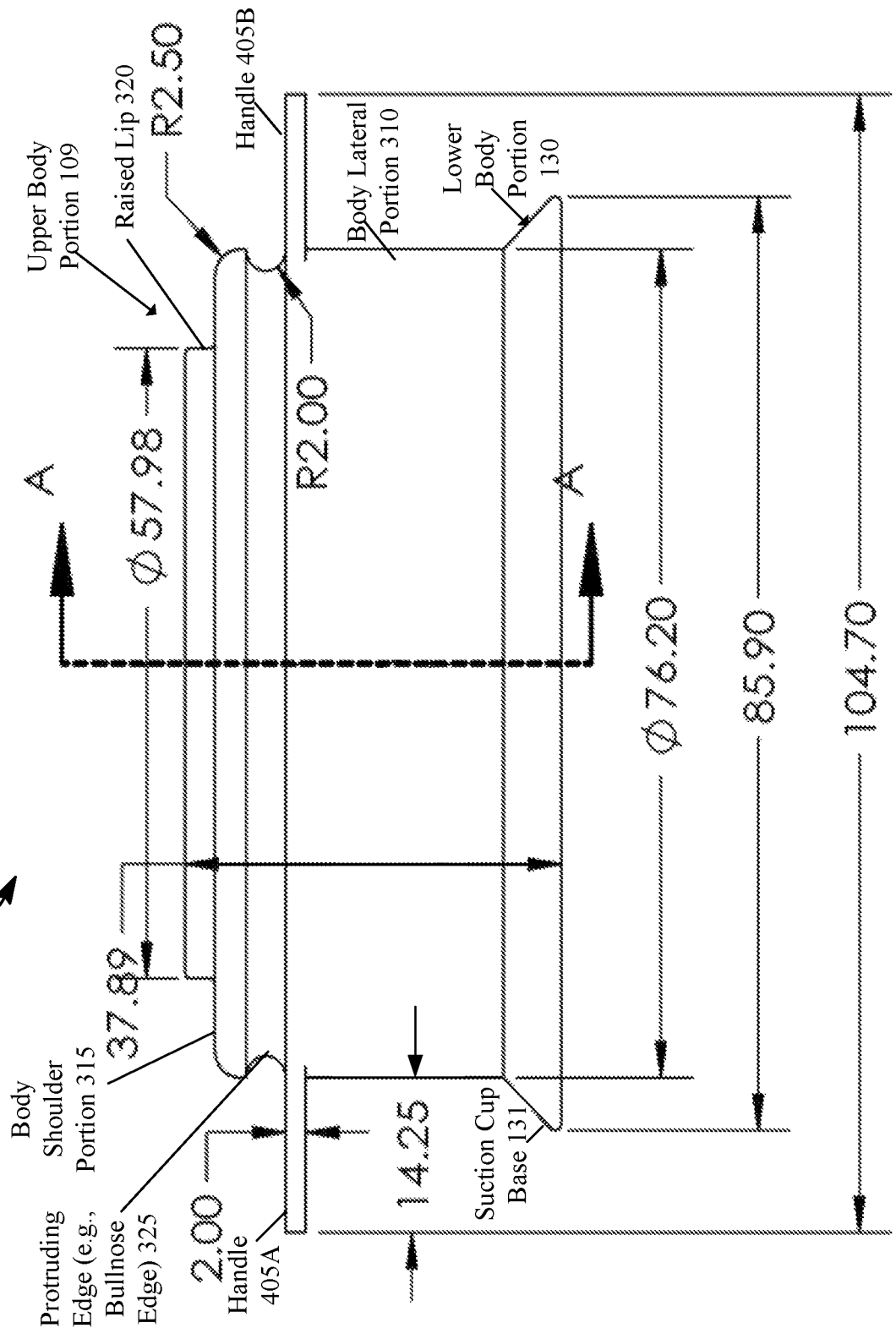
FIG. 4E is the same side view of the cooking tool of FIG. 4D detailing example dimensions, hardness, curvature, etc. of the various structures of the cooking tool.

FIG. 4C is the same top view of the cooking tool 105 of FIGS. 4A-B detailing example dimensions of the various structures of the cooking tool 105. FIG. 4D is a side view of the cooking tool 105 of FIGS. 4A-C. FIG. 4D is like that of FIG. 3C, but further depicts handles 405A-B. FIG. 4E is the same side view of the cooking tool 105 of FIG. 4D detailing example dimensions, hardness, curvature, etc. of the various structures of the cooking tool 105.

Figure 4F:
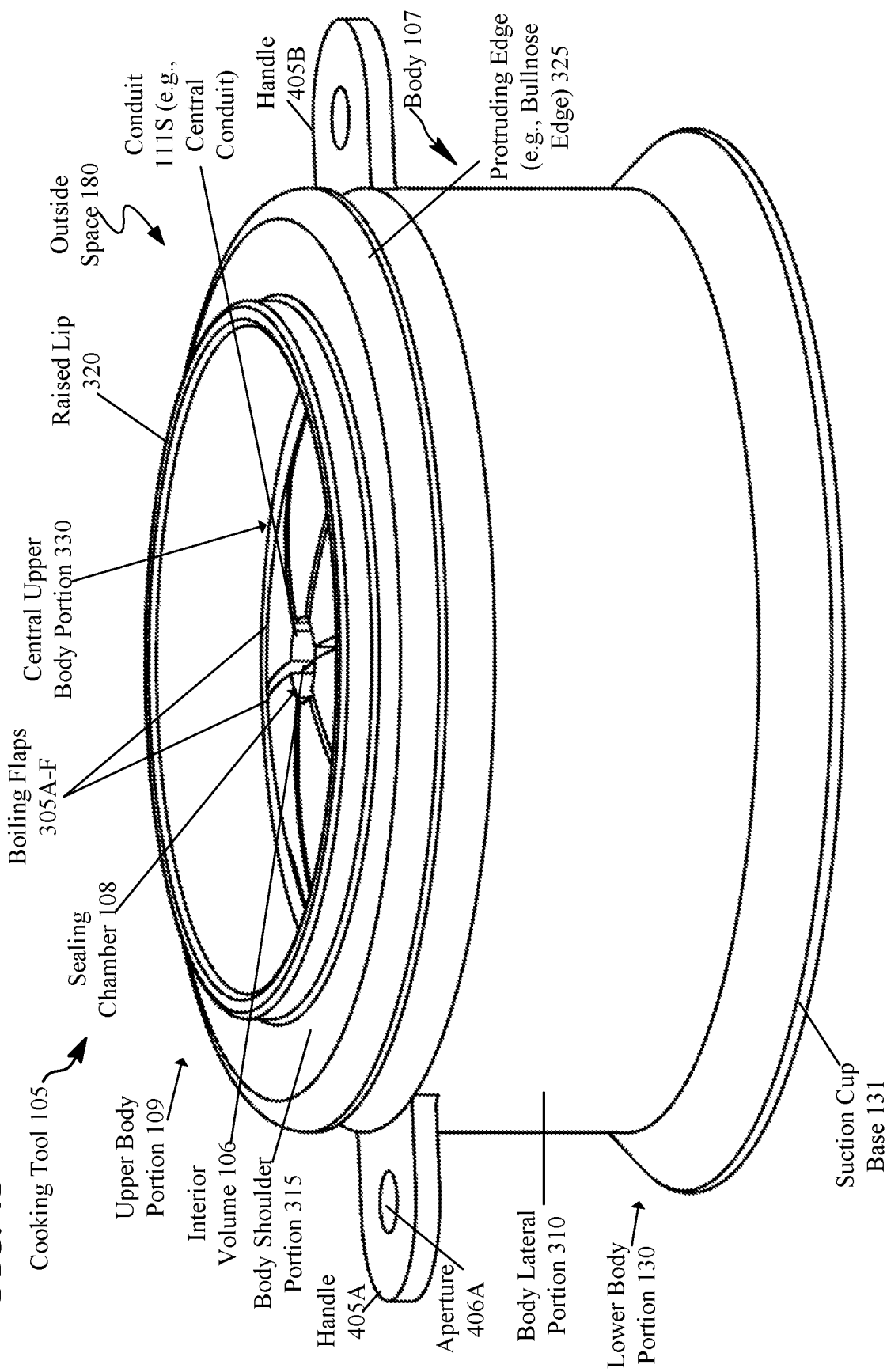
FIG. 4F is a front perspective view of the cooking tool of FIGS. 4A-E depicting a body of the cooking tool shaped as a ring-shaped structure shown in solid lines.
Figure 4G:
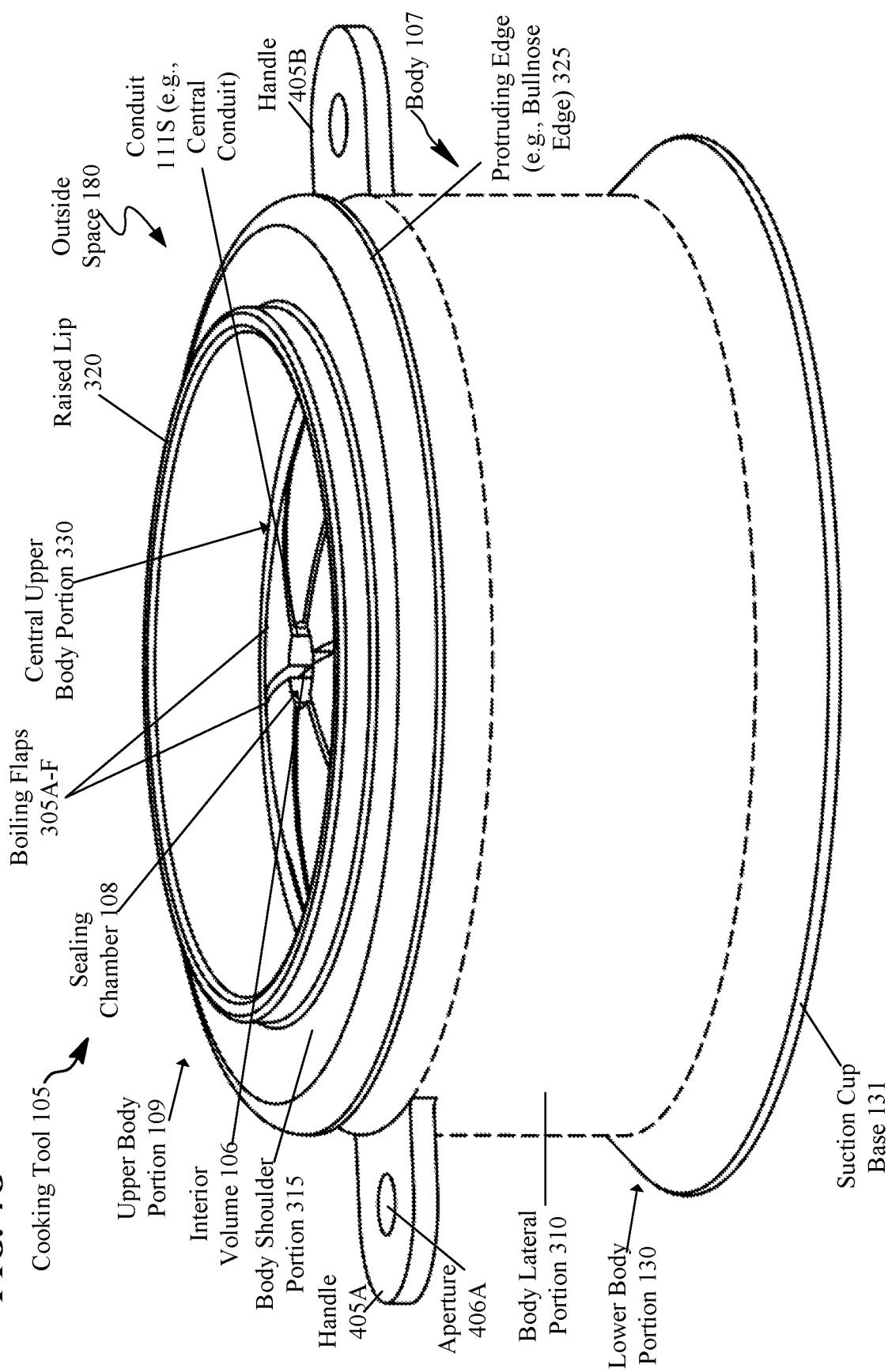
FIG. 4G is another front perspective view of the cooking tool like that of FIG. 4F, but depicting the shape of the body of the cooking tool in broken lines to indicate that the shape can vary.

FIG. 4F is a front perspective view of the cooking tool of FIGS. 4A-E depicting a body 107 of the cooking tool 105. In FIG. 4F, the body 107 is shaped as a ring-shaped structure shown in solid lines. FIG. 4G is another front perspective view of the cooking tool 105 like that of FIG. 4F. In FIG. 4G, a shape of the body 107 is depicted in broken lines (e.g., the body lateral portion 110) to indicate that having a ring-shaped body 107 is optional. Although only the body lateral portion 310 of the body 107 is depicted in broken lines, other portions of the body 107 (e.g., upper body portion 109, lower body portion 130, and body shoulder portion 315) along with the body lateral portion 310 can be formed into any desired shape of the body 107. Moreover, the portions of the body 107 can be of different shapes, for example the suction cup base 131 can have a ring-shape profile while the body lateral portion 310 can be a polygon shape profile.

Figure 4H:
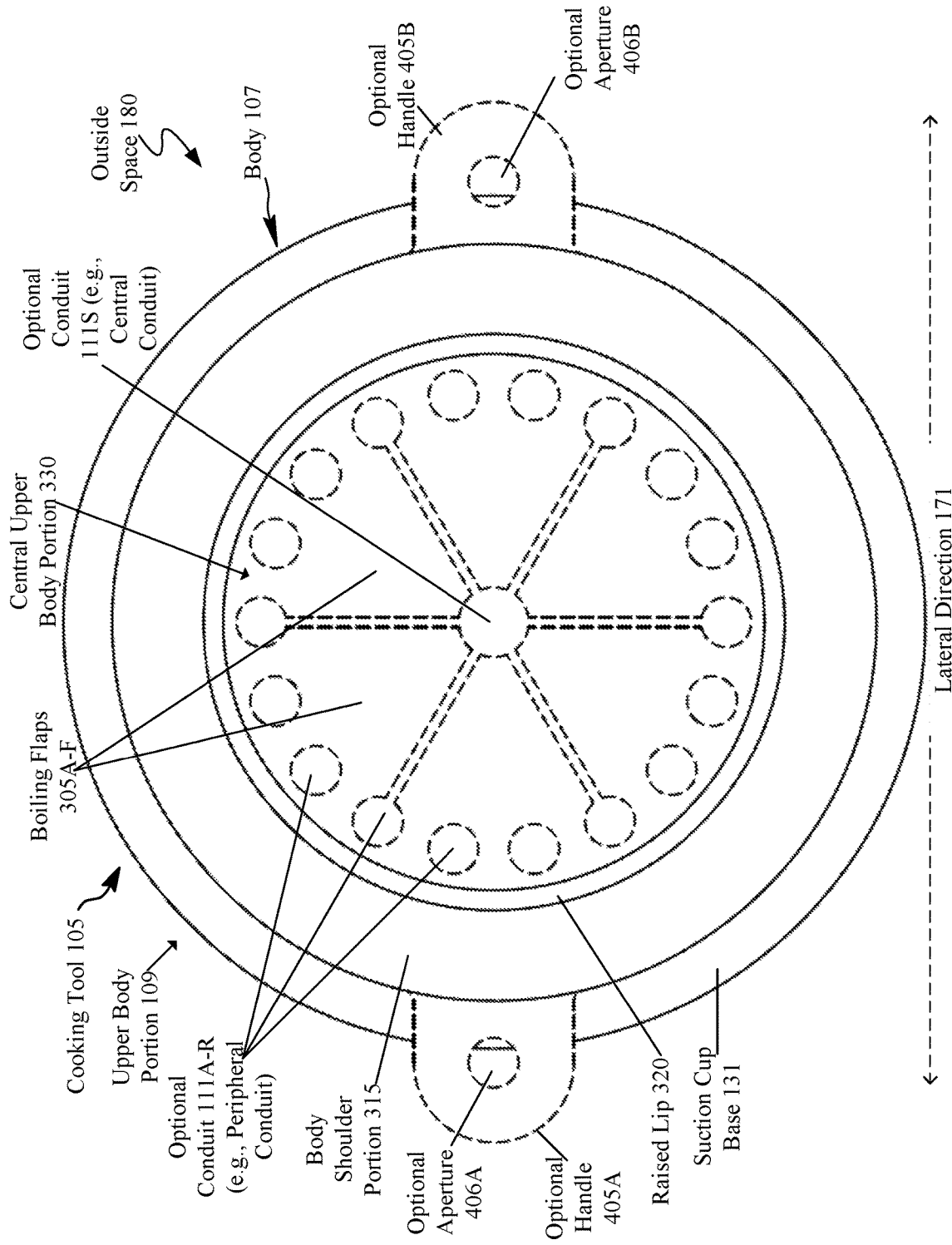
FIG. 4H is another top view of the cooking tool like that of FIG. 4B, but depicting the boiling flaps, central conduit, peripheral conduits, handles, and apertures of the cooking tool as optional in broken lines.
Figure 4I:
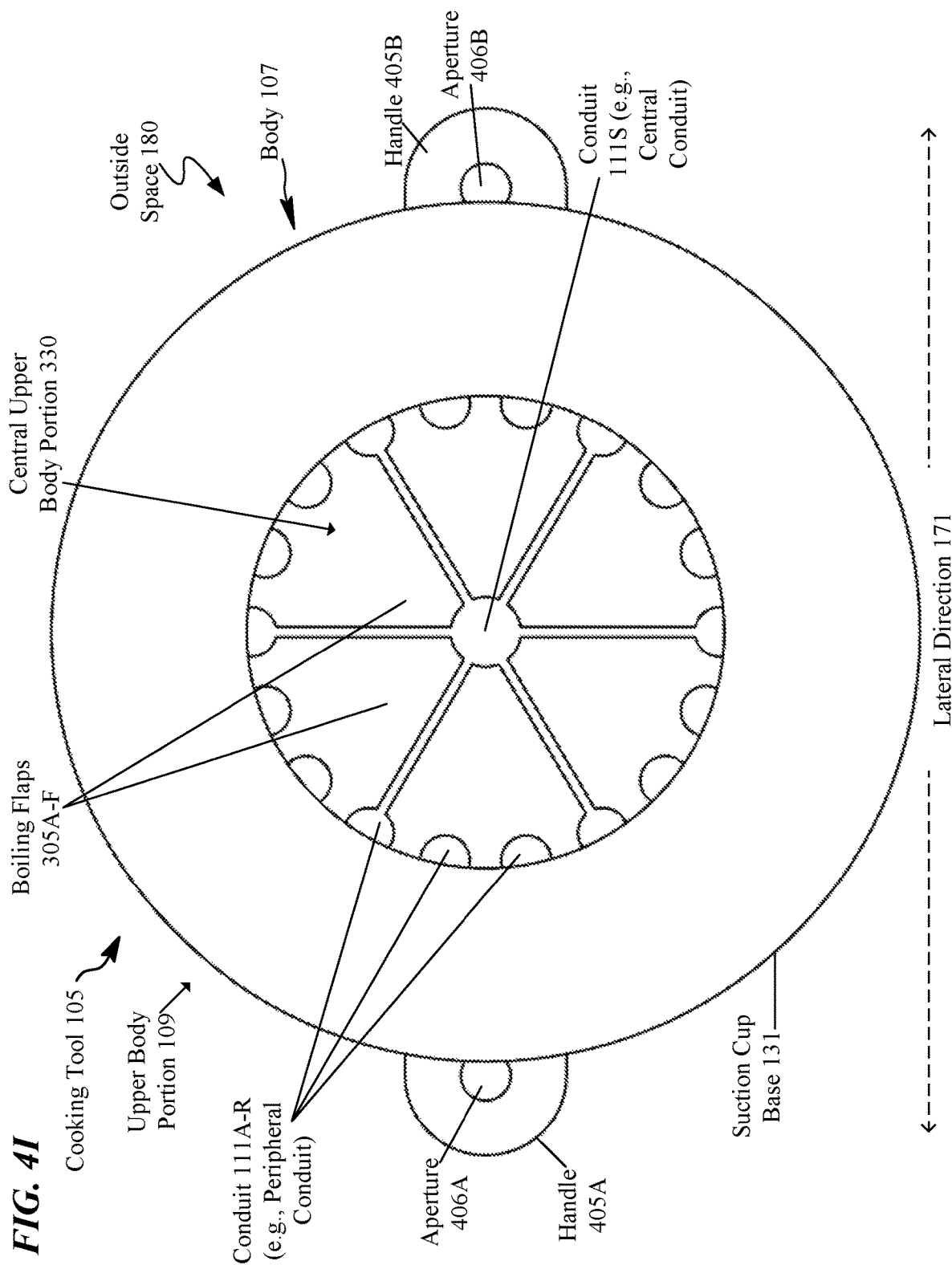
FIG. 4I is a bottom view of the cooking tool of FIGS. 4A-H depicting the boiling flaps, central conduit, peripheral conduits, handles, and apertures in solid lines.
Figure 4J:
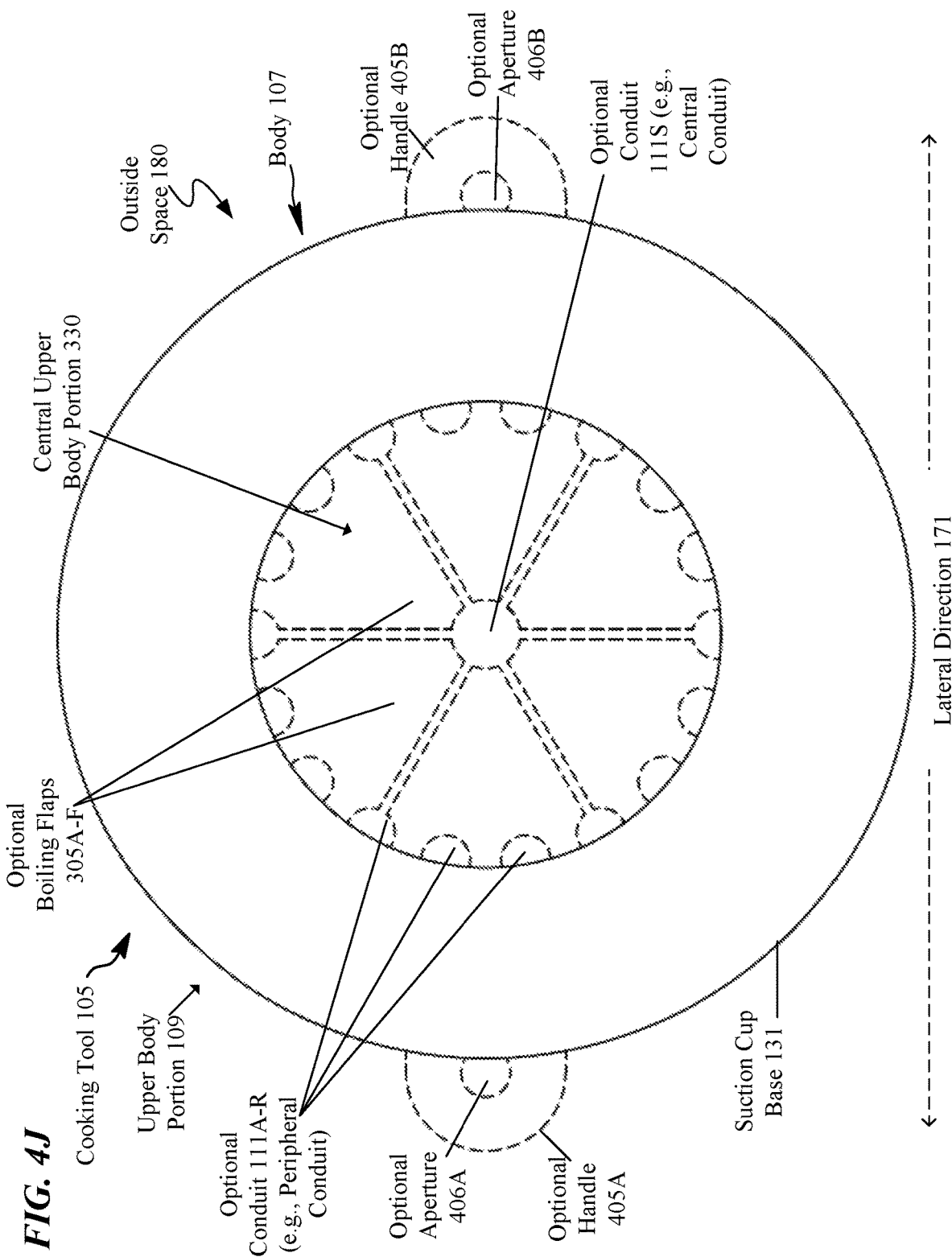
FIG. 4J is another bottom view of the cooking tool like that of FIG. 4I, but depicting the boiling flaps, central conduit, peripheral conduits, handles, and apertures of the cooking tool as optional in broken lines.

FIG. 4H is another top view of the cooking tool like that of FIG. 4B. In FIG. 4H, the boiling flaps 305A-F, central conduit 111S, peripheral conduits 111A-R, handles 405A-B, and apertures 406A-B formed in the handles 405A-B of the cooking tool 105 are depicted in broken lines to indicate those structures can vary and are optional. FIG. 4I is a bottom view of the cooking tool 105 of FIGS. 4A-H depicting the boiling flaps 305A-F, central conduit 111S, peripheral conduits 111A-R, handles 405A-B, and apertures 406A-B in solid lines. FIG. 4J is another bottom view of the cooking tool 105 like that of FIG. 4I. In FIG. 4J, the boiling flaps 305A-F, central conduit 111S, peripheral conduits 111A-R, handles 405A-B, and apertures 406A-B of the cooking tool 105 are depicted in broken lines to indicate that the structures are optional and the arrangement can vary as described above, e.g., in FIG. 3I.

Figure 5B:
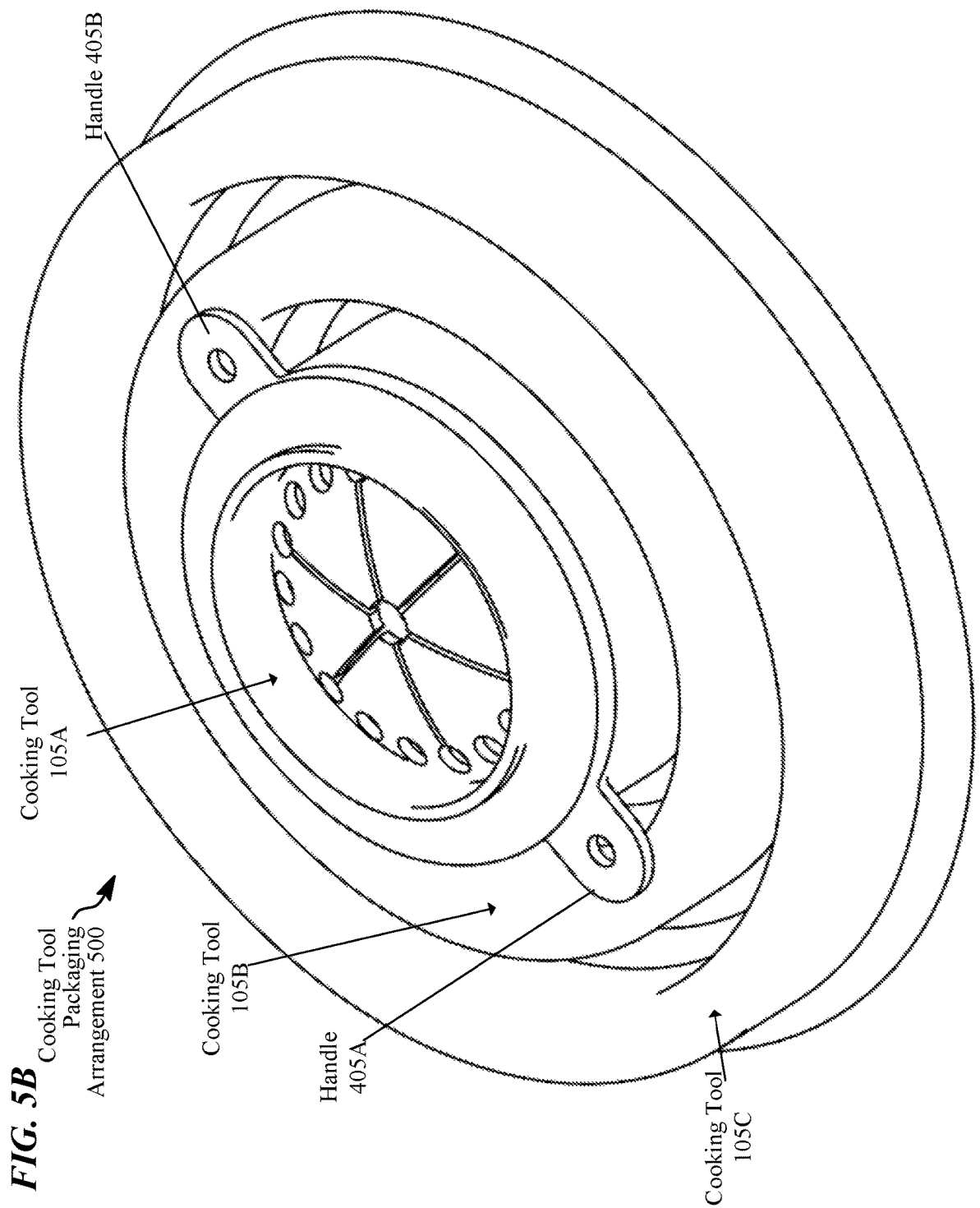
FIG. 5B is a left perspective view of the cooking tool packaging arrangement of FIG. 5A.

FIG. 5A is a front perspective view of a cooking tool packaging arrangement 500 that includes three cooking tools 105A-C packaged together. As shown in FIGS. 5A-F and 6, a first cooking tool 105A with handles 405A-B is nested within a second cooking tool 105B without handles 405A-B. The second cooking tool 105B with the first cooking tool 105A nested inside is, in turn, nested within a third cooking tool 105C without handles 405A-B. As discussed above, a plurality of sizes (e.g., two, three, four, five, etc.) of cooking tools 105A-C can be nested within each other in the cooking tool packaging arrangement 500 to reduce the bulkiness and form factor of the stored plurality of cooking tools 105A-C. Such a nested cooking tool packaging arrangement 500 can also reduce a size of a packaging container (e.g., shipping box or container) and household space (e.g., cabinet or drawer) needed to store the cooking tools 105A-C. Elimination of the handles 405A-B in the second cooking tool 105B and the third cooking tool 105C also facilitates nesting and reduces the size of the packaging container and the household space needed for storage.

Figure 5C:
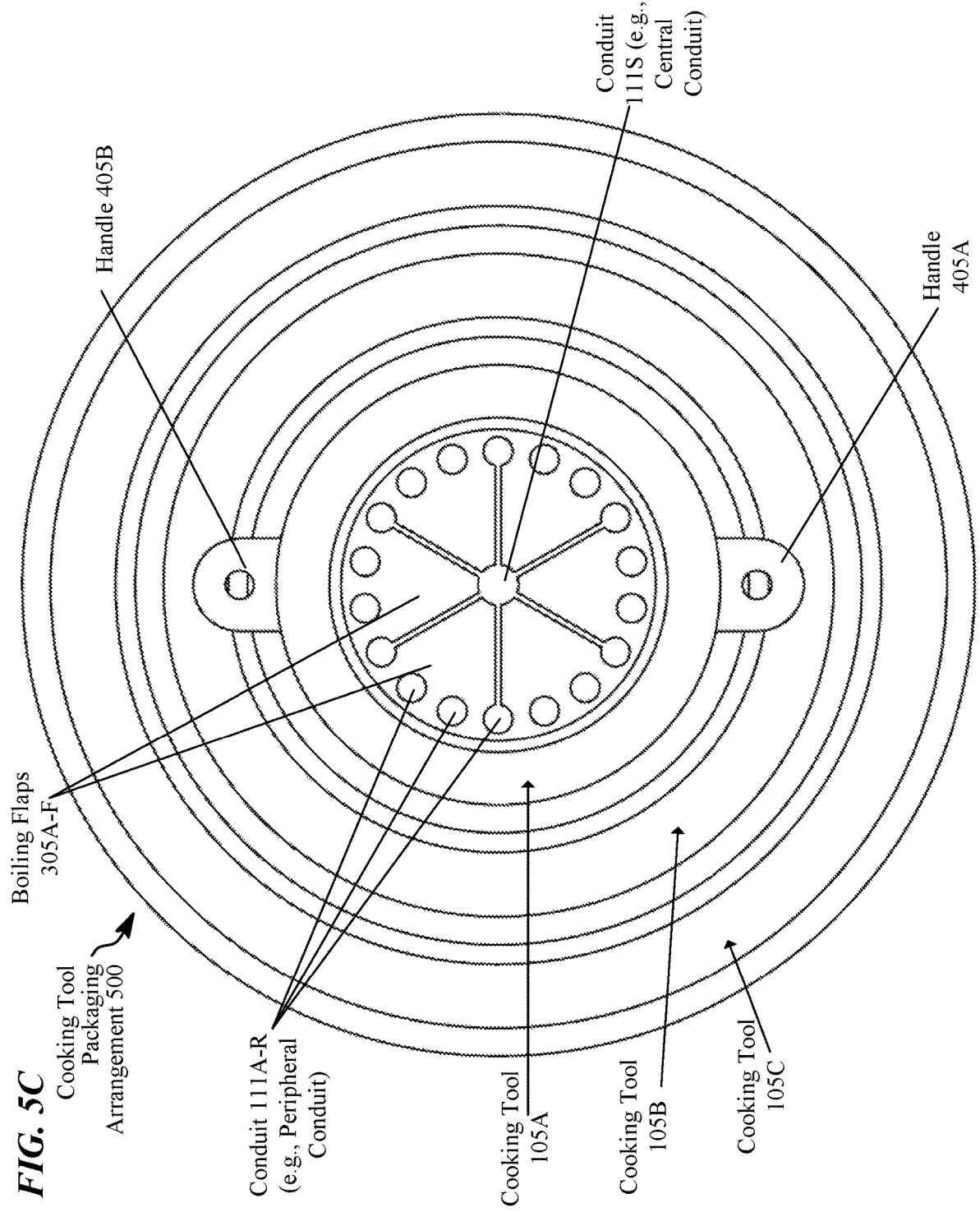
FIG. 5C is a top view of the cooking tool packaging arrangement of FIGS. 5A-B.
Figure 5D:
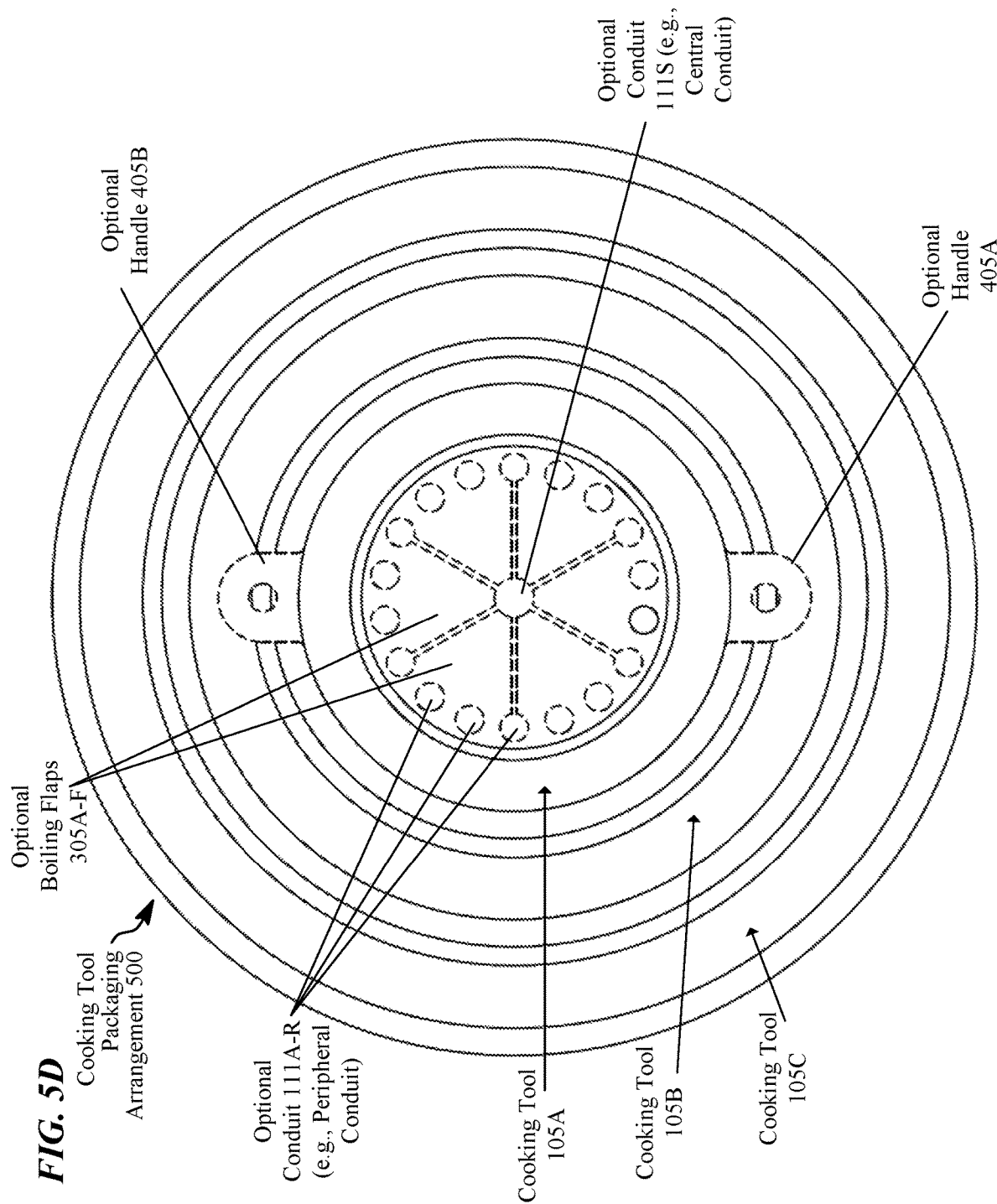
FIG. 5D is another top view of the cooking tool packaging arrangement like that of FIG. 5C, but depicting the boiling flaps, central conduit, peripheral conduits, and handles of the cooking tool in broken lines to indicate that the boiling flaps, arrangement of the conduits, and handles are optional and can vary.

FIG. 5B is a left perspective view of the cooking tool packaging arrangement 500 of FIG. 5A. FIG. 5C is a top view of the cooking tool packaging arrangement 500 of FIGS. 5A-B. Boiling flaps 305A-F, peripheral conduits 111A-R and central conduit 111S of the first cooking tool 105A are visible in the top view of FIG. 5C. FIG. 5D is another top view of the cooking tool packaging arrangement like that of FIG. 5C, but depicting the boiling flaps 305A-F, central conduit 111S, peripheral conduits 111A-R, and handles 405A-B of the first cooking tool 105A in broken lines to indicate that the boiling flaps 305A-F, arrangement of the conduits 111A-S, and handles 405A-B are optional and can vary.

Figure 5E:
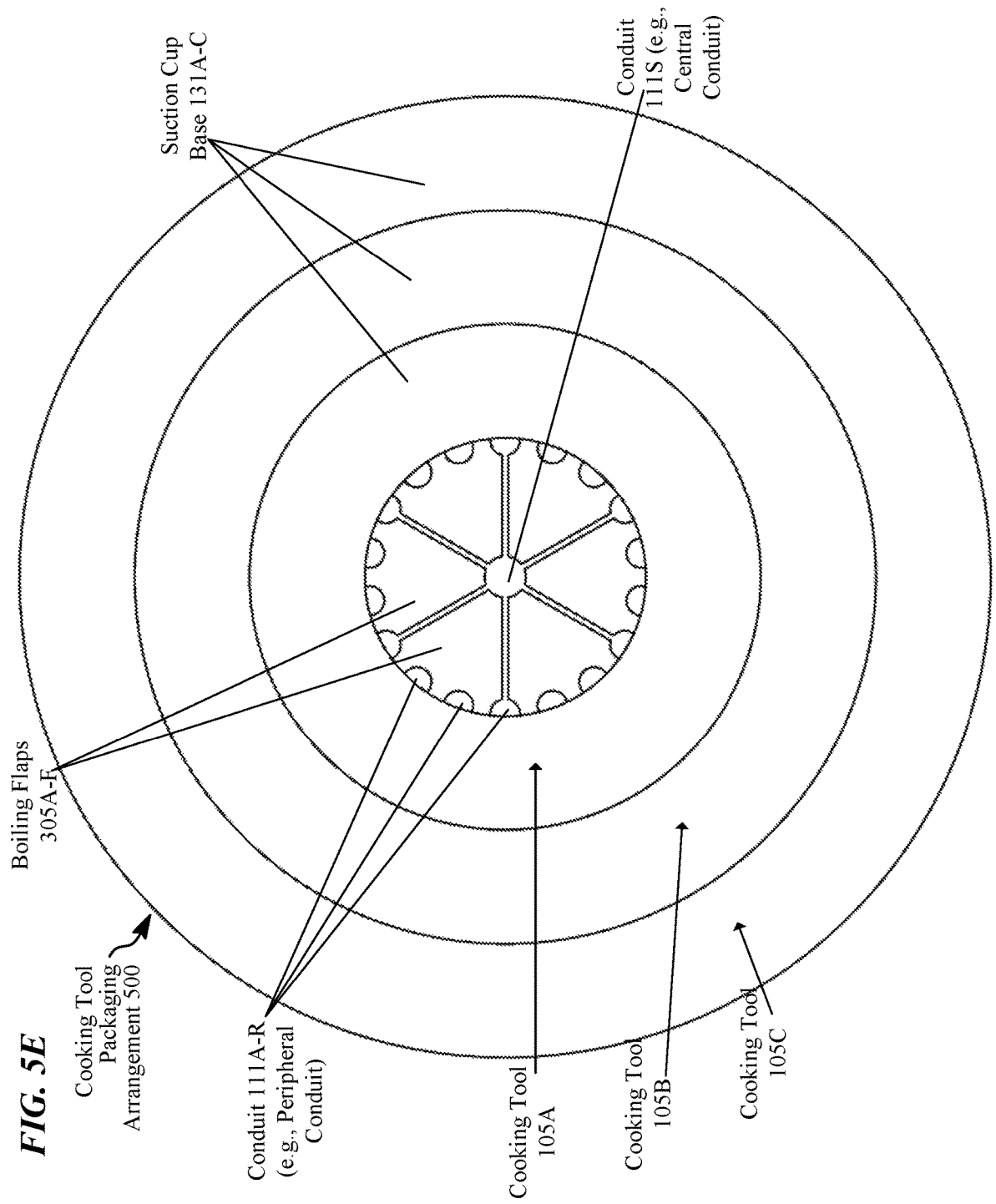
FIG. 5E is a bottom view of the cooking tool packaging arrangement of FIGS. 5A-D.
Figure 5F:
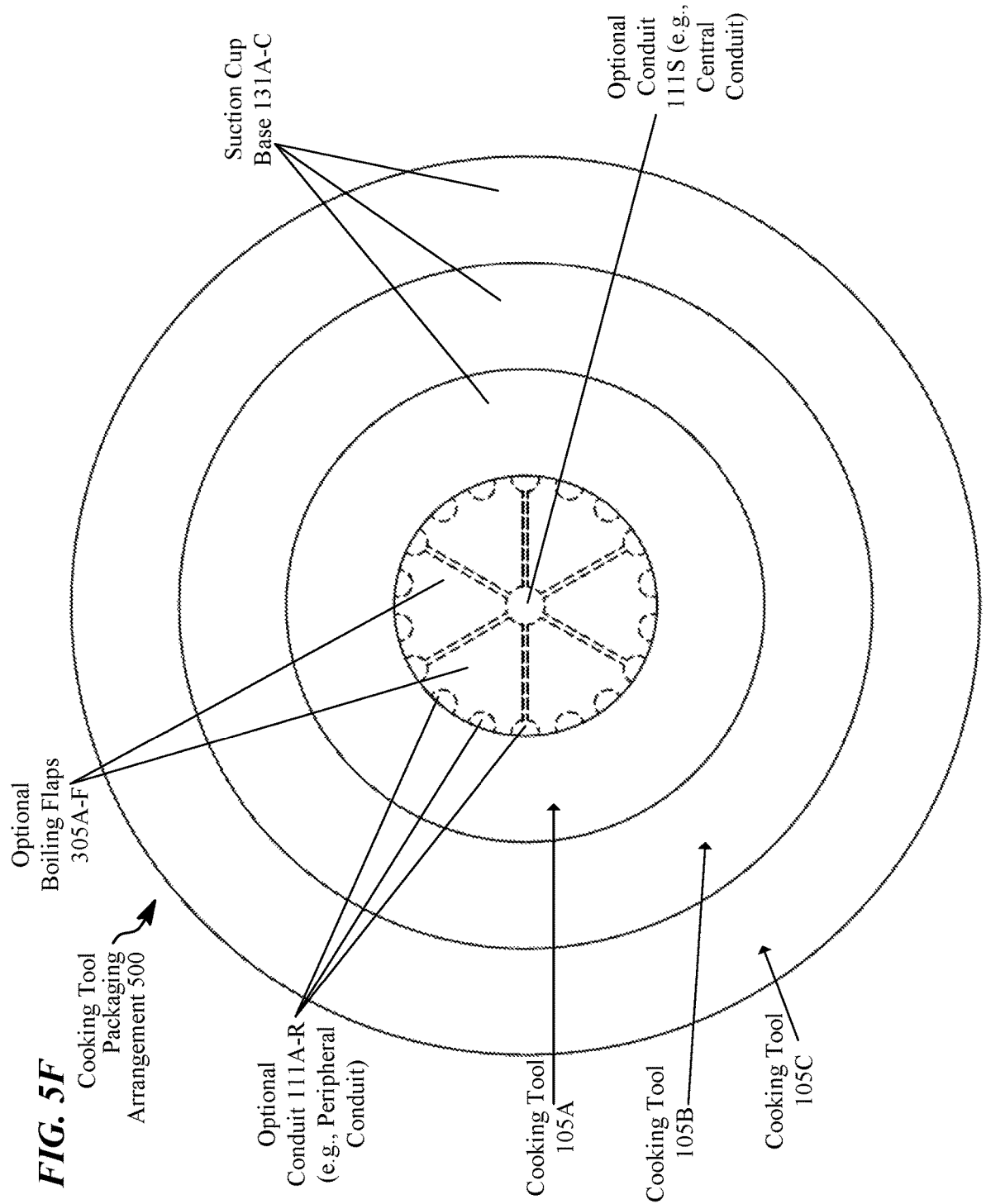
FIG. 5F is another bottom view of the cooking tool packaging arrangement like that of FIG. 5E, but depicting the boiling flaps, central conduit, peripheral conduits, and handles of the cooking tool in broken lines to indicate that the boiling flaps, arrangement of the conduits, and handles are optional and can vary.

FIG. 5E is a bottom view of the cooking tool packaging arrangement 500 of FIGS. 5A-D. As shown, each of the three cooking tools 105A-C includes a respective suction cup base 131A-C. Boiling flaps 305A-F, peripheral conduits 111A-R, and central conduit 111S of the first cooking tool 105A are visible in the bottom view. FIG. 5F is another bottom view of the cooking tool packaging arrangement 500 like that of FIG. 5E. But the boiling flaps 305A-F, central conduit 111S, peripheral conduits 111A-R, and handles 405A-B of the first cooking tool 105A are shown in broken lines to indicate that the boiling flaps 305A-F, arrangement of the conduits 111A-S, and handles 405A-B are optional and can vary.

FIG. 6 is a cross-sectional view of the nested cooking tool packaging arrangement 500 of FIGS. 5A-F depicting details of the suction cup base 131A-C of the cooking tools 105A-C for attachment to a placement surface 102. As shown, each of the cooking tools 105A-C includes a respective suction cup base 131A-C. Each respective suction cup base 131A-C includes respective legs 334A-B and respective feet 335A-B for attachment to the placement surface 102. In FIG. 6, only the legs 334A-B and feet 335A-B of the first suction cup base 131A of the first cooking tool 105A are labeled. However, it can be seen that the second suction cup base 131B of the second cooking tool 105B and the third suction cup base 131C of the third cooking tool 105C likewise include the same structures of legs 334A-B and feet 335A-B. Similarly, only the interior volume 106 and the sealing chamber 108 of the first cooking tool 105A are labeled.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "with," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A cooking system, comprising:
   a placement surface;
   a heat source to channel heat energy; and
   a cooking tool coupled to the placement surface, the cooking tool including:
   an interior volume, wherein a food is on the placement surface and located exterior to the interior volume in an outside space that resides outside the cooking tool; and
   a body that includes a lower body portion for coupling to the placement surface and an upper body portion, wherein:
   the lower body portion includes a suction cup base for coupling to the placement surface to form a sealing chamber to seal a liquid or food inside the interior volume, the lower body portion is positioned on the placement surface to form the sealing chamber, the sealing chamber being a well filled with the liquid in the interior volume, the suction cup base is coupled to the placement surface to enclose the liquid between the placement surface and the upper body portion to form the well filled with the liquid in the interior volume, the upper body portion releases steam generated from the liquid in response to channeled heat energy from the heat source and includes at least one conduit, and the at least one conduit includes at least one vent hole to release the generated steam and allow flow of the generated steam out of the interior volume to the outside space to cook the food on the placement surface.

2. The cooking system of claim 1, wherein:
the cooking tool is oriented substantially laterally to the food on the placement surface.

3. The cooking system of claim 1, wherein:
the upper body portion includes at least one boiling flap to block the liquid in a boiling state from splashing outside of the interior volume; and
the at least one conduit is an opening formed in the at least one boiling flap.

4. The cooking system of claim 3, wherein:
the upper body portion includes a raised lip located peripherally to the at least one boiling flap; and
the raised lip abuts the at least one boiling flap and slopes upwards from the at least one boiling flap.

5. The cooking system of claim 1, wherein:
the upper body portion includes a central upper body portion;
the central upper body portion includes a plurality of conduits; and
the plurality of conduits include a central conduit and peripheral conduits.

6. The cooking system of claim 5, wherein:
the central upper body portion includes an aspherical, spherical, or planar surface.

7. The cooking system of claim 5, wherein:
the upper body portion further includes a plurality of boiling flaps surrounding the central conduit; and
the peripheral conduits are formed in the plurality boiling flaps, each of the boiling flaps including at least one respective peripheral conduit.

8. The cooking system of claim 5, wherein:
the peripheral conduits are annularly arranged around the central conduit.

9. The cooking system of claim 1, wherein:
the body further includes a body lateral portion that extends from the suction cup base to the upper body portion; and
the at least one conduit is an opening formed in the upper body portion.

10. The cooking system of claim 9, wherein:
the body further includes a body shoulder portion; and
the body shoulder portion extends between the body lateral portion and intersects the upper body portion.

11. The cooking system of claim 10, wherein:
the body shoulder portion includes a protruding edge that abuts the upper body portion.

12. The cooking system of claim 11, wherein:
the protruding edge includes a bullnose edge;
the bullnose edge is circumferentially arranged around the upper body portion; and
the bullnose edge is continuous and curves around the upper body portion.

13. The cooking system of claim 11, wherein:
the protruding edge includes a bullnose edge; and
the bullnose edge is linearly arranged on opposing sides of the upper body portion.

14. The cooking system of claim 1, wherein:
the suction cup base includes a plurality of legs and a plurality of feet for coupling to the placement surface to form the sealing chamber; and
a respective foot is coupled to a distal end of a respective leg for attachment to the placement surface.

15. The cooking system of claim 14, wherein:
the body is circular or oval shaped; and
the plurality of legs and the plurality of feet are continuously arranged around the circular or oval shaped body.

16. The cooking system of claim 1, wherein:
the body is a polygon shape or a portion thereof; and
the plurality of legs and the plurality of feet are discontinuously arranged around the polygon or the portion thereof shaped body and in aggregate form the sealing chamber.

17. A cooking system, comprising:
a placement surface;
a heat source to channel heat energy; and
a cooking tool coupled to the placement surface, the cooking tool including:
an interior volume, wherein a liquid is on the placement surface and located exterior to the interior volume in an outside space that resides outside the cooking tool; and
a body that includes a lower body portion for coupling to the placement surface and an upper body portion, wherein:
the lower body portion includes a suction cup base for coupling to the placement surface to form a sealing chamber to seal a food inside the interior volume,
the lower body portion is positioned on the placement surface to form a sealing chamber, the sealing chamber being a cavity filled with the food in the interior volume,
the suction cup base is coupled to the placement surface to seal out the liquid on the placement surface and to form the cavity filled with the food in the interior volume,
the upper body portion flows steam generated from the liquid in response to channeled heat energy from the heat source and includes at least one conduit, and
the at least one conduit includes at least one passage to flow the generated steam and allow passage of the generated steam into the interior volume from the outside space to cook the food filling the cavity.

18. The cooking system of claim 17, wherein:
the cooking tool is oriented substantially laterally to the liquid on the placement surface.

19. The cooking system of claim 17, wherein:
the upper body portion includes at least one boiling flap; and
the at least one conduit is an opening formed in the at least one boiling flap.

20. The cooking system of claim 19, wherein:

the upper body portion includes a raised lip located peripherally to the at least one boiling flap; and the raised lip abuts the at least one boiling flap and slopes upwards from the at least one boiling flap.

21. The cooking system of claim 17, wherein:

the upper body portion includes a central upper body portion;

the central upper body portion includes a plurality of conduits; and the plurality of conduits include a central conduit and peripheral conduits.

22. The cooking system of claim 21, wherein:

the central upper body portion includes an aspherical, spherical, or planar surface.

23. The cooking system of claim 21, wherein:

the upper body portion further includes a plurality of boiling flaps surrounding the central conduit; and the peripheral conduits are formed in the plurality boiling flaps, each of the boiling flaps including at least one respective peripheral conduit.

24. The cooking system of claim 21, wherein:

the peripheral conduits are annularly arranged around the central conduit.

25. The cooking system of claim 17, wherein:

the body further includes a body lateral portion that extends from the suction cup base to the upper body portion; and the at least one conduit is an opening formed in the upper body portion.

26. The cooking system of claim 25, wherein:

the body further includes a body shoulder portion; and the body shoulder portion extends between the body lateral portion and intersects the upper body portion.

27. The cooking system of claim 26, wherein:

the body shoulder portion includes a protruding edge that abuts the upper body portion.

28. The cooking system of claim 27, wherein:

the protruding edge includes a bullnose edge;

the bullnose edge is circumferentially arranged around the upper body portion; and the bullnose edge is continuous and curves around the upper body portion.

29. The cooking system of claim 27 wherein:

the protruding edge includes a bullnose edge; and the bullnose edge is linearly arranged on opposing sides of the upper body portion.

30. The cooking system of claim 17, wherein:

the suction cup base includes a plurality of legs and a plurality of feet for coupling to the placement surface to form the sealing chamber; and a respective foot is coupled to a distal end of a respective leg for attachment to the placement surface.

31. The cooking system of claim 30, wherein:

the body is circular or oval shaped; and the plurality of legs and the plurality of feet are continuously arranged around the circular or oval shaped body.

32. The cooking system of claim 17, wherein:

the body is a polygon shape or a portion thereof; and the plurality of legs and the plurality of feet are discontinuously arranged around the polygon or the portion thereof shaped body and in aggregate form the sealing chamber.

* * * * *

UNITED STATES PATENT AND TRADEMARK OFFICE
CERTIFICATE OF CORRECTION

PATENT NO. : 10,973,361 B1
APPLICATION NO. : 17/005882
DATED : April 13, 2021
INVENTOR(S) : Mehrnaz H. Arshadi It is certified that error appears in the above-identified patent and that said Letters Patent is hereby corrected as shown below:

In the Specification

Column 5, Line 53, the text "upper body portion 10" should read as follows: -upper body portion 109-

Column 8, Line 31, the text "the coking system 100" should read as follows: -the cooking system 100-

Column 10, Line 29, the text "silicon" should read as follows: -silicone-

Column 10, Line 61, the text "silicon" should read as follows: -silicone-

Column 12, Line 9, the text "silicon" should read as follows: -silicone-

Column 12, Line 11, the text "silicon" should read as follows: -silicone-

Column 12, Line 12, the text "silicon" should read as follows: -silicone-

Column 12, Line 15, the text "silicon" should read as follows: -silicone-

Column 12, Line 16, the text "silicon" should read as follows: -silicone-

Column 12, Line 18, the text "silicon" should read as follows: -silicone-

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*